(12) United States Patent
Bonicatto et al.

(10) Patent No.: US 7,742,393 B2
(45) Date of Patent: Jun. 22, 2010

(54) LOCATING ENDPOINTS IN A POWER LINE COMMUNICATION SYSTEM

(75) Inventors: Damian G. Bonicatto, Pequot Lakes, MN (US); Verne J. Olson, Pequot Lakes, MN (US); Chad K. Wolter, Breezy Point, MN (US); Rolf J. Flen, Pequot Lakes, MN (US); David F. Olson, Pequot Lakes, MN (US)

(73) Assignee: Hunt Technologies, Inc., Pequot Lakes, MN (US)

(*) Notice: Subject to any disclaimer, the term of this patent is extended or adjusted under 35 U.S.C. 154(b) by 1355 days.

(21) Appl. No.: 10/626,496

(22) Filed: Jul. 24, 2003

(65) Prior Publication Data

US 2005/0083925 A1 Apr. 21, 2005

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04J 3/24 | (2006.01) |
| H04J 1/00 | (2006.01) |
| G05B 11/01 | (2006.01) |
| G08C 15/06 | (2006.01) |
| H04L 12/28 | (2006.01) |

(52) U.S. Cl. ............... 370/216; 370/242; 370/389; 370/475; 370/480; 340/310.11; 340/870.02

(58) Field of Classification Search ............ 370/389, 370/351, 392, 395.1, 396, 395.2, 395.21, 370/464, 465, 475, 480, 481, 482; 340/310, 340/538, 870; 713/300
See application file for complete search history.

(56) References Cited

U.S. PATENT DOCUMENTS

| | | | |
|---|---|---|---|
| 4,114,151 A | 9/1978 | Denne et al. | |
| 4,291,375 A | 9/1981 | Wolf | ............ 702/62 |
| 4,310,805 A | 1/1982 | Hackert et al. | |
| 4,359,644 A | 11/1982 | Foord | |
| 4,396,915 A | 8/1983 | Farnsworth et al. | |

(Continued)

FOREIGN PATENT DOCUMENTS

| | | |
|---|---|---|
| CN | 1278678 A | 1/2001 |
| WO | WO 92/21177 | 11/1992 |

OTHER PUBLICATIONS

U.S. Non-final Official Action dated Feb. 27, 2006 cited in U.S. Appl. No. 10/626,495.

(Continued)

*Primary Examiner*—Kevin C Harper
*Assistant Examiner*—Xavier Szewai Wong
(74) *Attorney, Agent, or Firm*—Merchant & Gould P.C.

(57) ABSTRACT

A system for bi-directional communication within a power distribution system. The system is configured to find an endpoint, the endpoint having an endpoint transceiver in electrical communication with a power distribution line. The power distribution line is within the power distribution system, and the endpoint is identified by a unique identifier (I.D.). The system comprises a substation transceiver electrically coupled to a power distribution line within the power distribution system. A substation circuit is in electrical communication with the substation transceiver. The substation circuit is programmed to map the unique I.D. endpoint to a base frequency within a bandwidth and to control the endpoint to transmit a find endpoint data packet onto the power distribution network. The find endpoint data packet includes the unique I.D. and the base frequency. The substation circuit is further programmed to assign a status to the base frequency upon receiving a signal from the endpoint, the status indicating that the substation transceiver is receiving signals in the frequency bandwidth.

5 Claims, 11 Drawing Sheets

U.S. PATENT DOCUMENTS

| | | | | |
|---|---|---|---|---|
| 4,418,333 | A | | 11/1983 | Schwarzbach et al. .. 340/310.01 |
| 4,504,831 | A | | 3/1985 | Jahr et al. ............... 340/870.03 |
| 4,517,548 | A | | 5/1985 | Ise et al. ........................ 307/3 |
| 4,517,562 | A | | 5/1985 | Martinez |
| 4,538,136 | A | | 8/1985 | Drabing ..................... 375/306 |
| 4,583,090 | A | | 4/1986 | Eden et al. ................. 375/272 |
| 4,602,340 | A | | 7/1986 | Appelberg ................... 368/11 |
| 4,636,771 | A | | 1/1987 | Ochs |
| 4,641,322 | A | | 2/1987 | Hasegawa ................... 375/145 |
| 4,700,188 | A | * | 10/1987 | James ................... 340/870.03 |
| 4,749,992 | A | | 6/1988 | Fitzemeyer et al. .... 340/870.02 |
| 4,799,059 | A | * | 1/1989 | Grindahl et al. ........ 340/870.03 |
| 4,937,569 | A | | 6/1990 | Trask et al. ............ 340/825.52 |
| 5,070,537 | A | | 12/1991 | Ohira et al. .............. 455/67.13 |
| 5,185,591 | A | | 2/1993 | Shuey ........................ 370/482 |
| 5,251,191 | A | | 10/1993 | Sturzl et al. ................... 368/47 |
| 5,334,975 | A | | 8/1994 | Wachob et al. ......... 340/825.21 |
| 5,416,364 | A | | 5/1995 | Divjak |
| 5,495,239 | A | * | 2/1996 | Ouellette ............... 340/870.02 |
| 5,502,726 | A | * | 3/1996 | Fischer ....................... 370/392 |
| 5,581,229 | A | | 12/1996 | Hunt |
| 5,731,765 | A | * | 3/1998 | Allison et al. .......... 340/870.03 |
| 5,805,573 | A | * | 9/1998 | Umeda ....................... 370/321 |
| 5,978,371 | A | | 11/1999 | Mason et al. ............... 370/389 |
| 6,002,213 | A | | 12/1999 | Wood |
| 6,021,137 | A | | 2/2000 | Kato et al. |
| 6,137,240 | A | | 10/2000 | Bogdan |
| 6,154,488 | A | | 11/2000 | Hunt .......................... 375/219 |
| 6,172,616 | B1 | | 1/2001 | Johnson et al. ........ 340/870.12 |
| 6,198,921 | B1 | * | 3/2001 | Youssefzadeh et al. ...... 455/428 |
| 6,388,564 | B1 | * | 5/2002 | Piercy et al. ........... 340/310.11 |
| 6,393,126 | B1 | | 5/2002 | van der Kaay et al. ...... 380/241 |
| 6,396,839 | B1 | | 5/2002 | Ardalan et al. .............. 370/401 |
| 6,577,231 | B2 | | 6/2003 | Litwin et al. ................. 375/356 |
| 6,686,848 | B1 | | 2/2004 | Morikawa ............... 340/825.22 |
| 6,690,295 | B1 | * | 2/2004 | De Boer ..................... 340/951 |
| 6,737,984 | B1 | * | 5/2004 | Welles et al. ........... 340/870.02 |
| 6,744,351 | B2 | | 6/2004 | Lei et al. ................ 340/309.16 |
| 6,781,968 | B1 | * | 8/2004 | Colella et al. ............... 370/316 |
| 6,834,002 | B2 | | 12/2004 | Yang |
| 6,834,091 | B2 | | 12/2004 | Litwin et al. ................. 375/356 |
| 6,838,978 | B2 | | 1/2005 | Aizu et al. ............. 340/286.02 |
| 6,900,737 | B1 | * | 5/2005 | Ardalan et al. ......... 340/870.02 |
| 6,947,854 | B2 | | 9/2005 | Swarztrauber et al. |
| 6,950,460 | B1 | | 9/2005 | Cappelletti et al. |
| 6,998,963 | B2 | | 2/2006 | Flen et al. .................... 375/260 |
| 7,012,505 | B1 | | 3/2006 | Arden ........................ 370/482 |
| 7,102,490 | B2 | | 9/2006 | Flen et al. |
| 7,145,438 | B2 | | 12/2006 | Flen et al. ............. 340/310.01 |
| 7,180,412 | B2 | | 2/2007 | Bonicatto et al. ....... 340/538.11 |
| 7,236,765 | B2 | | 6/2007 | Bonicatto et al. ........... 455/402 |
| 2001/0008391 | A1 | | 7/2001 | Yuasa |
| 2002/0071395 | A1 | * | 6/2002 | Redi et al. ................... 370/252 |
| 2002/0140547 | A1 | | 10/2002 | Litwin et al. ........... 340/310.01 |
| 2003/0007570 | A1 | | 1/2003 | Kim et al. |
| 2003/0048152 | A1 | | 3/2003 | Brown et al. |
| 2003/0096629 | A1 | * | 5/2003 | Elliott et al. ................. 455/522 |
| 2004/0008018 | A1 | | 1/2004 | Miller et al. |
| 2004/0105386 | A1 | * | 6/2004 | Sipola ...................... 370/230.1 |
| 2006/0208661 | A1 | * | 9/2006 | Mogilner et al. ......... 315/209 R |
| 2008/0266134 | A1 | * | 10/2008 | Kline .................... 340/870.03 |

OTHER PUBLICATIONS

U.S. Final Official Action dated Oct. 20, 2006 cited in U.S. Appl. No. 10/626,495.

U.S. Appl. No. 10/626,495, entitled "Data Communication Over Power Lines" filed Jul. 24, 2003, Inventor: Damian G. Bonicatto, et al.

U.S. Appl. No. 11/527,008, entitled "Endpoint Event Processing System" filed Sep. 26, 2006, Inventor: Rolf J. Flen, et al.

U.S. Appl. No. 10/626,465, entitled "Power Line Communication System Having Time Server" filed Jul. 24, 2003, Inventor: Damian G. Bonicatto, et al.

U.S. Appl. No. 11/760,041 filed Jun. 8, 2007 entitled "Data Communication Over Power Lines".

U.S. Appl. No. 11/700,431 filed Jan. 31, 2007 entitled "Power Line Communication System Having Timer Server".

U.S. Office Action dated Apr. 1, 2008 cited in U.S. Appl. No. 11/527,008.

* cited by examiner

LOCATING ENDPOINTS IN A POWER LINE COMMUNICATION SYSTEM

REFERENCE TO COPENDING APPLICATIONS

The present application is being filed concurrently with U.S. patent application Ser. No. 10/626,495 now U.S. Pat. No. 7,236,765, which is entitled Data Communication Over Power Lines, U.S. patent application Ser. No. 10/626,465 now U.S. Pat. No. 7,180,412, which is entitled Power Line Communication System Having Time Server, U.S. patent application Ser. No. 10/627,397 now U.S. Pat. No. 6,998,936, which is entitled Endpoint Processing and Communication System, U.S. patent application Ser. No. 10/627,587 now U.S. Pat. No. 7,102,490, which is entitled Endpoint Transmitter and Power Generation System, and U.S. patent application Ser. No. 10/627,590 now U.S. Pat. No. 7,145,438, which is entitled Endpoint Event Processing System, the entire disclosures of which are hereby incorporated by reference.

TECHNICAL FIELD

This invention relates generally to data communication, and more particularly to locating endpoints in a power line communication system.

BACKGROUND

As is true with most companies, utility companies are striving to reduce overhead costs, while providing more convenience to customers. For example, electric companies are migrating from costly and time-consuming manual methods of determining the amount of power consumed by customers of the power company. Traditionally, a person periodically came to the customer's home, and requested entry to read the consumer power usage from a power meter. This type of process was costly, slow, and intrusive to their customers.

Newer systems provide some level of remote communication between an endpoint such as an electrical meter and a central location. One such system is an automated meter reading (AMR) system that utilizes a power line to establish a data link between a concentrator and endpoint meter reading units positioned downstream from the substation. The concentrator typically includes a transmitter for transmitting control information to the endpoint and a receiver for receiving data such as watt-hour information from the endpoint. The endpoint includes a transmitter, a receiver, and electronics or other circuitry for reading the meter. Other remote meter reading and data communication systems that use modems, radio frequency signals, or power line communication (PLC) signals can communicate with only one endpoint at a time and thus have limited capacity.

These current systems have shortcomings. For example, the capacity of such systems is limited because the concentrator (or other central processing system if modems or RF are used) can receive signals from only one endpoint at a given time. This limitation provides a bottleneck that limits the processing power and flexibility of the system. Additionally, it limits the number of endpoints that the concentrator can communicate within a 24-hour period and hence limits the number of endpoints that can be connected downstream from any given concentrator.

The systems also have little scalability. This limitation is caused by two factors including the limited number of endpoints that can be connected downstream from a concentrator and by the manual programming required every time that an endpoint is added to the system.

Other shortcomings of current AMR and other power line data communication systems relate to reliability, flexibility, and scalability. For example, the system needs to be manually programmed each time an endpoint is added. In another example, if there is a power outage, automated meter reading systems generally require polling of the endpoints to determine which ones are still operational. This polling is slow and consumes processing and communication resources. Furthermore, current systems generally do not have the capability of reestablishing communication between an endpoint and an alternative concentrator if the communication link between the concentrator and the endpoint is disconnected by intentionally taking the substation off line, through a power failure.

SUMMARY

In general terms, the present invention relates to a system for locating endpoints in a power line communication system.

One aspect of the invention is a system for bi-directional communication within a power distribution system. The system is configured to find an endpoint, the endpoint having an endpoint transceiver in electrical communication with a power distribution line. The power distribution line is within the power distribution system, and the endpoint is identified by a unique identifier (I.D.). The system comprises a substation transceiver electrically coupled to a power distribution line within the power distribution system. A substation circuit is in electrical communication with the substation transceiver. The substation circuit is programmed to map the unique I.D. for the endpoint to a base frequency within a bandwidth and to control the endpoint to transmit a find endpoint data packet onto the power distribution network. The find endpoint data packet includes the unique I.D. and the base frequency. The substation circuit is further programmed to assign a status to the base frequency upon receiving a signal from the endpoint, the status indicating that the substation transceiver is receiving signals in the frequency bandwidth.

Another aspect of the invention is a computer data signal embodied in a carrier wave readable by a programmable circuit and encoding a data packet. The data packet comprises a character string identifying a unique endpoint. The endpoint includes an endpoint transceiver in electrical communication with a power distribution line within a power distribution system. An endpoint circuit is in electrical communication with the endpoint transceiver. An automated meter reading device is in electrical communication with the endpoint circuit. The data packet further comprises a base frequency corresponding to a bandwidth over which the endpoint transceiver will transmit a signal upon receipt and processing of the data packet, and a find command instructing the endpoint transceiver to transmit a signal over the bandwidth corresponding to the base frequency. The carrier wave is transmitted over a power distribution line within the power distribution system.

DETAILED DESCRIPTION

Figure 1:
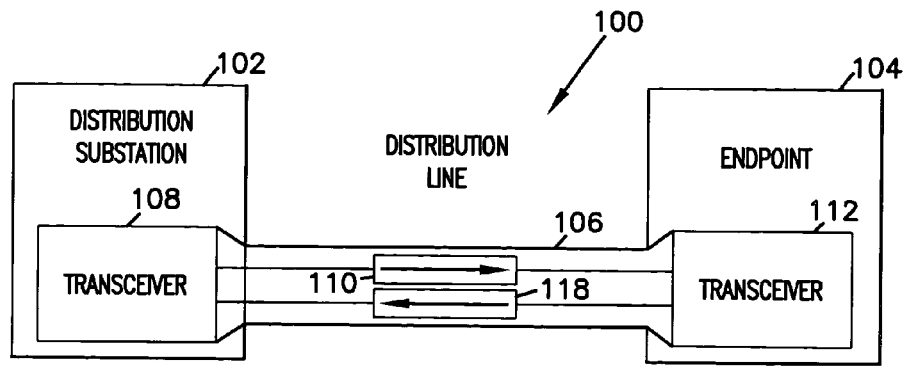
FIG. 1 is a block diagram illustrating one link of a power distribution network over which data is communicated between a distribution substation and an endpoint according to one possible embodiment of the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 is a block diagram of one link of an electric distribution system 100 distributing power between a distribution substation and a customer device at the power consumer's site. An electrical distribution system, or distribution plant as it is sometimes referred to, is that part of an electric power system that receives power from a power generator via high-voltage transmission lines, reduces or steps down the voltage, and then distributes the power to an endpoint at the premise of an energy customer. Within the electrical distribution system, distribution lines typically conduct electricity from the distribution substation to the endpoints. Distribution lines typically consist of underground cable, aerial cable, or overhead open-wire conductors carried on poles, or some combination of them.

There may be multiple layers of distribution substations connected in series between the power generation and the endpoint, wherein each consecutive distribution substation further steps down the voltage of the electricity being transmitted. Additionally, the power generators, distribution substations, and endpoints are commonly organized in a network where various generators supplying power can be taken on or off line and the distribution substation through which a particular endpoint receives its electricity can be changed, all without a loss or interruption of power.

Distribution transformers are ordinarily connected in the distribution line between the distribution substation and the endpoint, which the distribution transformers serve to further step-down the voltage to a level that is used by consumers. These step-down transformers, often referred to as pole transformers, supply a consumer or group of consumers over a secondary circuit. Each consumer is connected to the secondary circuit through its service leads and meter.

The distribution substation 102 shown in FIG. 1 provides power to a customer device or endpoint 104 via a distribution line 106. The distribution line 106 may be coupled to one or more step-down transformers before reaching the customer premise. The distribution line 106 provides the power necessary to operate electrical devices, located at the endpoint 104, which is a device at the customer premise. Endpoints are discussed in U.S. patent application Ser. No. 10/627,397 now U.S. Pa. No. 6,998,936, which is entitled Endpoint Processing and Communication System, the entire disclosure of which is hereby incorporated by reference.

For a variety of reasons, it may be desirable to communicate information from the distribution substation 102 to one or more endpoints 104 at a particular customer premise. For example, it may be desirable to control or monitor a meter-reading device, which is installed at a customer premise to determine the power consumption at that customer premise. Additionally, control information could provide the ability to control or alter the operation of the meter-reading device and/or individual loads at the customer premise. Utility companies often provide a customer with a power rate discount if the customer agrees to allow for a temporary adjustment of their consumption. For example, a power company may provide a customer with a rate discount where the customer agrees to allow the power company to temporarily adjust or terminate their power consumption for certain nonessential power consuming devices, such as water heaters, swimming pool heaters, air conditioners, etc. during peak operation. This allows the utility company to limit the peak power consumption when necessary, hereinafter referred to as "load control."

Other more general information, which is not necessarily to "control" customer devices, also can be provided via the power distribution lines. These general information signals are transmitted in the same manner as signals intended to control a customer device. Such general information signals include information to display or store the price of power at the customer premise, the date and time, the temperature or other information capable of being received and translated at the customer premise. For example, the time displayed on an electronic device at the customer premise could be periodically adjusted to display an accurate time as transmitted by the utility station.

Various embodiments of the apparatuses and methods disclosed herein communicate control signals and general information signals to endpoints 104 via the distribution line 106 to control customer devices and provide more general information to the customer. Information from the customer device also may be sent via the distribution line 106 to the distribution substation 102, thereby creating a two-way control information communication link via the distribution line 106. The aforementioned examples of control signal applications where control signals (and/or general information signals) are provided by the distribution substation to an endpoint 104 are merely representative of the various uses that such control signals provide. Therefore, the examples provided throughout the application are illustrative in nature, as the invention is not limited to any particular control signal use.

In order to provide control information at the distribution substation 102, a substation controller 108, which includes a substation transceiver, is used to drive the control signals along the distribution line 106 in the direction represented by the arrow 110. An endpoint transceiver 112 at the customer device 104 is configured to recognize the control signals transmitted by the substation controller 108. Similarly, the substation controller 108 receives information, such as a power consumption reading, from the endpoint transceiver 112 in the direction represented by arrow 118.

The control information communications link 100 shown in FIG. 1 therefore provides a full-duplex or bi-directional communication link between the distribution substation 102 and the endpoint 104, which is typically located at a customer premise. Full duplex in this sense refers to simultaneous communications in both directions, although the information sent in one direction may travel at a speed different from that of the information provided in the opposite direction. This full-duplex communication link via the distribution line 106 provides for reliable transmission of control information, without the need for additional wiring, thereby minimizing cost and increasing data integrity.

Figure 2:
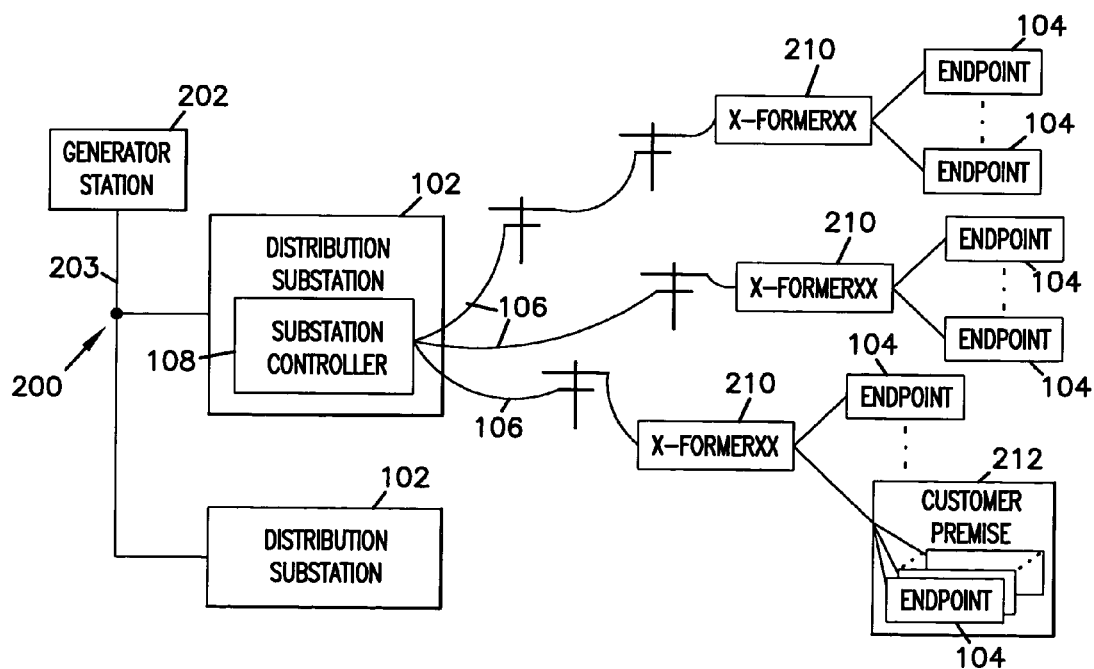
FIG. 2 is a block diagram illustrating a portion of a power distribution network over which data is communicated between a distribution substation and an endpoint according to one possible embodiment of the present invention.

Referring now to FIG. 2, a block diagram of a power distribution system 200, which is substantially similar to the electrical distribution system 100 described above. In this exemplary embodiment, generating station 202 provides the bulk power to downstream distribution substations 102 via high-power transmission lines 203. At least one of the distribution substations 102 includes the substation controller 108. As can be seen by the example of FIG. 2, the substation controller 108 can simultaneously communicate data via the distribution lines 106 to multiple endpoints 104 residing in multiple customer premises. The control information can pass through transformers 210, and ultimately to a particular endpoint 104 located at a customer premise. A plurality of endpoints 104 located at different customer premises may be serviced by a particular transformer 210. Furthermore, a single customer premise such as site 212 may include a plurality of different customer devices or endpoints 104. The transfer of control information from a substation controller 108 to a great number of endpoint transceivers at different endpoints 104 is very useful and cost effective. In various embodiments, one or more of the distribution substations 102 may include the substation controller 108 for communicating with endpoints 104 located downstream from the distribution substation 102. In other embodiments, the substation controller 108 is located at points that are upstream from multiple endpoints 104 other than a distribution substation 102.

Figure 3:
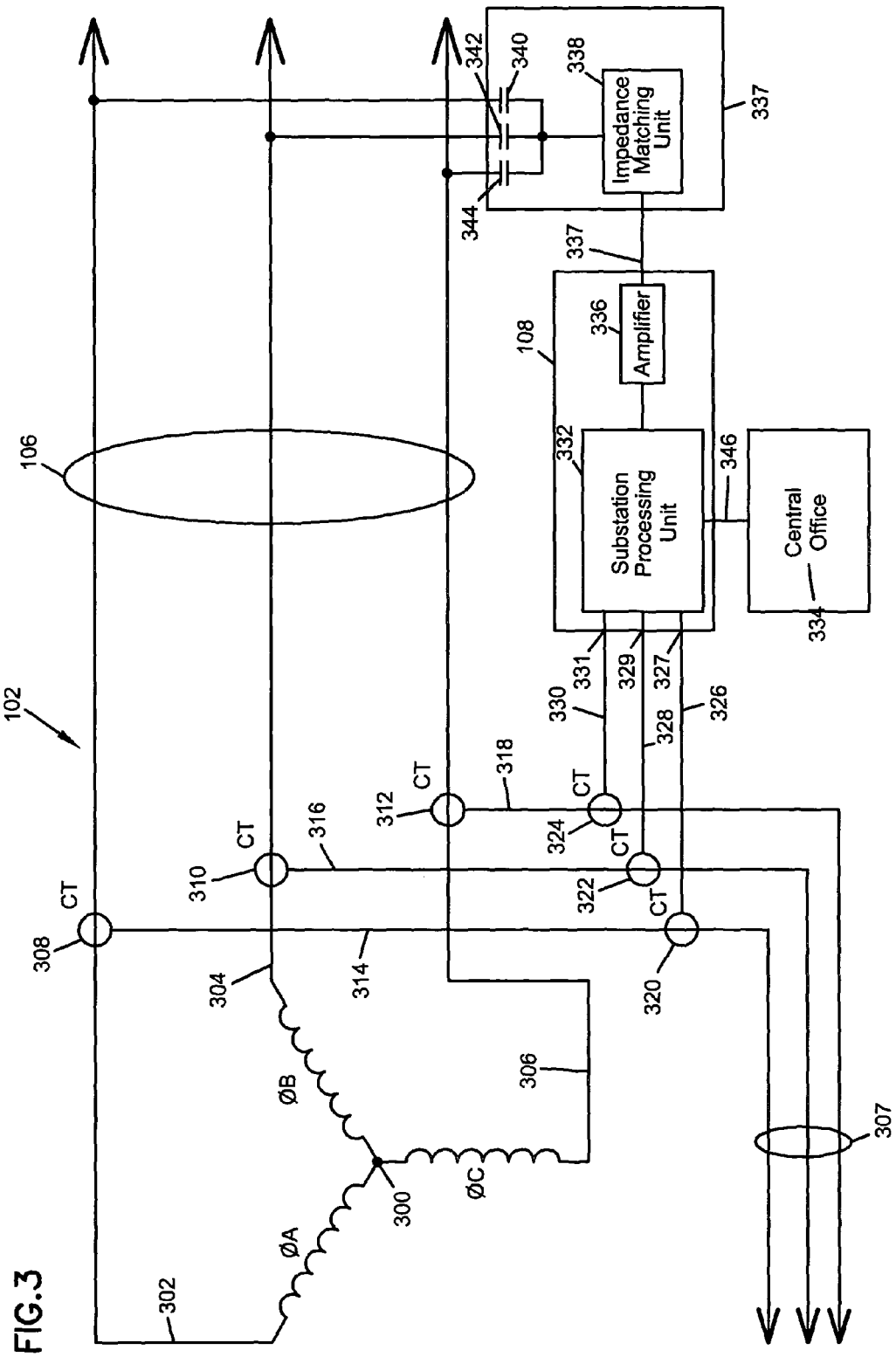
FIG. 3 is a schematic illustrating a substation controller and power line coupler according to one possible embodiment of the present invention.

FIG. 3 illustrates the distribution substation 102 and one possible embodiment of the connection of the substation controller 108 to the distribution line 106. In this exemplary embodiment, the distribution line 106 interfaces with a main transformer 300 that provides three-phase power (φA, φB, and φC) and includes three distribution line conductors 302, 304, and 306, one for conducting each phase of the power. The first conductor 302 conducts φA, the second conductor 304 conducts φB, and the third conductor 306 conducts φC.

A metering loop 307 has three metering lines 314, 316, and 318 that interface with the three distribution line conductors 302, 304, and 306, respectively. The metering line 314 interfaces with the distribution line conductor 302 through a current transformer 308, the metering line 316 interfaces with the distribution line conductor 304 through a current transformer 310, the metering line 318 interfaces with the distribution line conductor 306 through a current transformer 312.

The substation controller 108 has three inputs 327, 329, and 331 for receiving data from the endpoint transceivers 112 and one output 337 for sending data to the endpoint transceivers, and includes a substation processing unit 332 and an amplifier 336. The three inputs 327, 329, and 331 interface with the metering loop 307 through current transformers 320, 322, and 324, respectively. Specifically, a first input has a line 326 that is coupled to the metering line 314 through a current transformer 320, a second input has a line 328 that is coupled to the metering line 316 through a current transformer 322, and a third input has a line 330 that is coupled to the metering line 318 through a current transformer 324.

In this exemplary embodiment, signals transmitted by an endpoint transceiver 112 connected to the first distribution line conductor 302, are communicated over the distribution line conductor 302, the metering line 314, the input line 330, and into the first input 327 of the substation controller 108. Signals transmitted from endpoint transceivers 112 connected to the second and third distribution line conductors 304 and 306 are fed to the substation controller 108 through inputs 329 and 331, respectively, following similar paths along distribution line conductors 304 and 306, respectively, metering lines 316 and 318, respectively, and input lines 328 and 330, respectively.

The substation processing unit 332 has a single output that feeds signals for downstream communication to the endpoint transceivers 112. This downstream signal from this single output is input to the amplifier 336. The amplifier 336 then outputs the downstream signal from the substation controller 108 to a power line coupler 337, which is formed by an impedance matching unit 338 and capacitors 340, 342, and 344.

The identical signal is then communicated from the impedance matching 338 onto each of the distribution line conductors 302, 304, and 306 through the capacitors 340, 342, and 344, respectively. The impedance matching unit 338 matches the impedance between the distribution line conductors 302, 304, and 306 and the amplifier 336. The capacitors 340, 342, and 344 electrically isolate the impedance matching unit from the distribution line 106.

In this exemplary embodiment, the substation controller 108 transmits its command to all of the downstream endpoint transceivers 112. In an alternative embodiment, the substation controller 108 can address a downstream signal to a particular endpoint transceiver 112.

In yet another possible embodiment, the substation controller 108 can shift the phase of the signal transmitted onto each of the distribution line conductors 302, 304, or 306 so that each conductor conducts a signal having a different phase. If the signal bleeds from one distribution line conductor 302, 304, or 306 to another distribution line conductor 302, 304, or 306, the signals tend to cancel each other because the electricity conducted on each of the distribution line conductors 302, 304, or 306 is out of phase by about 120°. Shifting the phase of the signal transmitted by the substation controller 108 reduces this cancellation when a signal bleeds from one distribution line conductor 302, 304, or 306 to another distribution line conductor 302, 304, or 306.

As explained in more detail herein, the substation processing unit communicates with a central office 334 via a data network 346. In various embodiments, the data network 346 is established using a suitable means for data communication. Examples, include the Internet, an Intranet, a wide area network, a local area network, satellite, microwave, and a modem interfacing with a plain old telephone line (POTS)

Additionally, other structures may have alternative structures and methods for retrieving a data signal from the distribution line 106, for transmitting a data signal onto the distribution line 106, and processing the signals in the substation controller 108. For example, the substation controller 108 might be broken into a separate receiver and transmitter.

Figure 4:
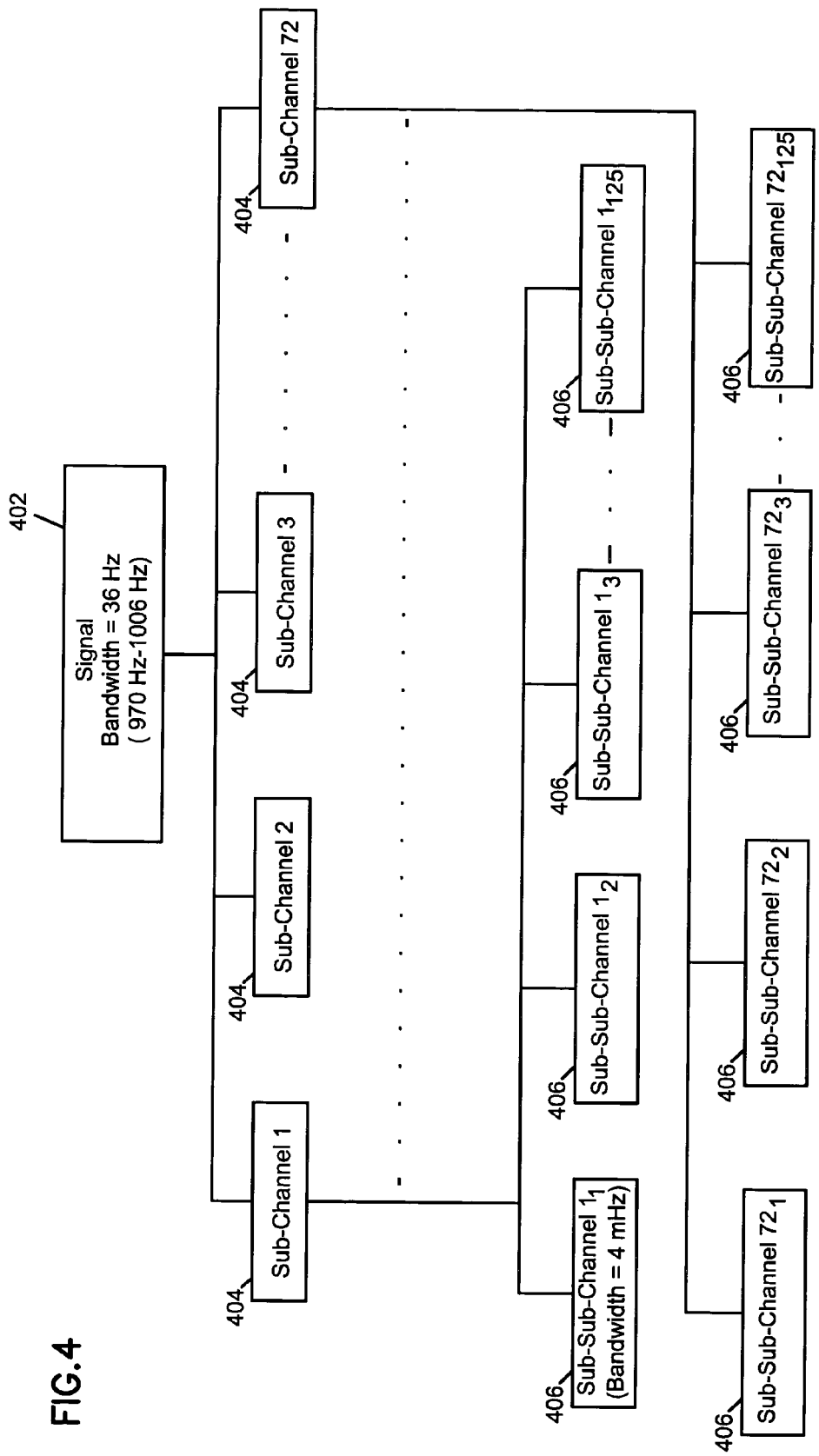
FIG. 4 is a block diagram illustrating a hierarchy of data channels as they are demodulated according to one possible embodiment of the present invention.

Referring to FIG. 4 and as explained in more detail herein, the endpoint transceivers 112 disclosed in the exemplary embodiment modulate the signals that they transmit to the substation controller 108 using frequency shift keying and transmits its signal to the substation controller 108 located at the distribution substation 102. In one possible embodiment of this modulation scheme, each endpoint transceiver 112 sends its signal within a channel 402 having a predetermined bandwidth of about 36 Hz, from about 970 Hz to about 1,006 Hz. When demodulating the signals received over the 36 Hz channel 402, the substation controller 108 separates the signals into about 72 sub-channels 404. It then separates each of the sub-channels 404 into about 125 sub-sub-channels 406. Each of the sub-sub channels 406 is assigned to a different downstream endpoint transceiver 112 and corresponds to a signal having a bandwidth of about 4 Hz.

In the exemplary embodiment, each endpoint transceiver 112 is assigned predetermined bandwidth of about 4 Hz, and each assigned predetermined bandwidth within the main channel 402 is mutually exclusive from one another. Given this configuration, the substation controller 108 has the capacity to receive signals from about 9,000 separate downstream endpoint transceivers 112. Additionally, the predetermined bandwidth for each sub-sub-channel 406 includes a base frequency to which an endpoint transceiver 112 is assigned and any frequency to which the base frequency is shifted when the endpoint transceiver 112 modulates a signal for transmission to the substation controller 108.

The distribution substation controller 108 demodulates each signal received from separate endpoint transceivers 112 substantially simultaneously, which provides significant advantages. For example, it increases the capacity of the system because the substation controller 108 does not have to delay reception of one signal from an endpoint transceiver 112 until the reception of the previous signal is completed.

As further explained herein, each distribution line 106 has three phases and one distribution line conductor 302, 304, and 306 for each phase. The interface for each of the three distribution line conductors 302, 304, and 306 receives one channel over each of the three distribution line conductors 302, 304, and 306. In one possible embodiment, each channel has a bandwidth of about 36 Hz, from about 970 Hz to about 1,006 Hz. Accordingly, the substation controller 108 performs the demodulation scheme illustrated in FIG. 4 for each distribution line conductor 302, 304, and 306 of the distribution line 106. This configuration gives the substation transceiver 106 the capacity to receive signals from up to about 9,000 endpoint transceivers 112 on any one or combination of the three distribution line conductors 302, 304, and 306.

There are many other additional embodiments in addition to those described herein. For example, an endpoint transceiver 112 can communicate with the substation controller 108 using any modulation scheme, including modulation schemes other than frequency shift keying, that permit simultaneous or substantially simultaneous demodulation of signals received from the endpoint transceivers 112. Additionally, other bandwidths can be used within the apparatus and methods disclosed herein. For example, the channel 402 might include a frequency bandwidth other than 36 Hz and other than the range of 970 Hz to 1,006 Hz. Yet other embodiment will have the capacity to receive signals from fewer than 9,000 endpoint transceivers 112 or more than 9,000 endpoint transceivers 112.

In alternative embodiments, the endpoint transceivers 112 communicate using frequency bandwidths other than 4 mHz. For example, various embodiments might use a frequency bandwidth of about 10 mHz or less, including frequencies of about 2 mHz, 6 mHz, or 8 mHz. Yet other embodiments use frequency bandwidths other than 2 mHz, 4 mHz, 6 mHz, 8 mHz, or 10 mHz. Still other embodiments might use frequency bandwidths greater than 10 mHz.

Figure 5:
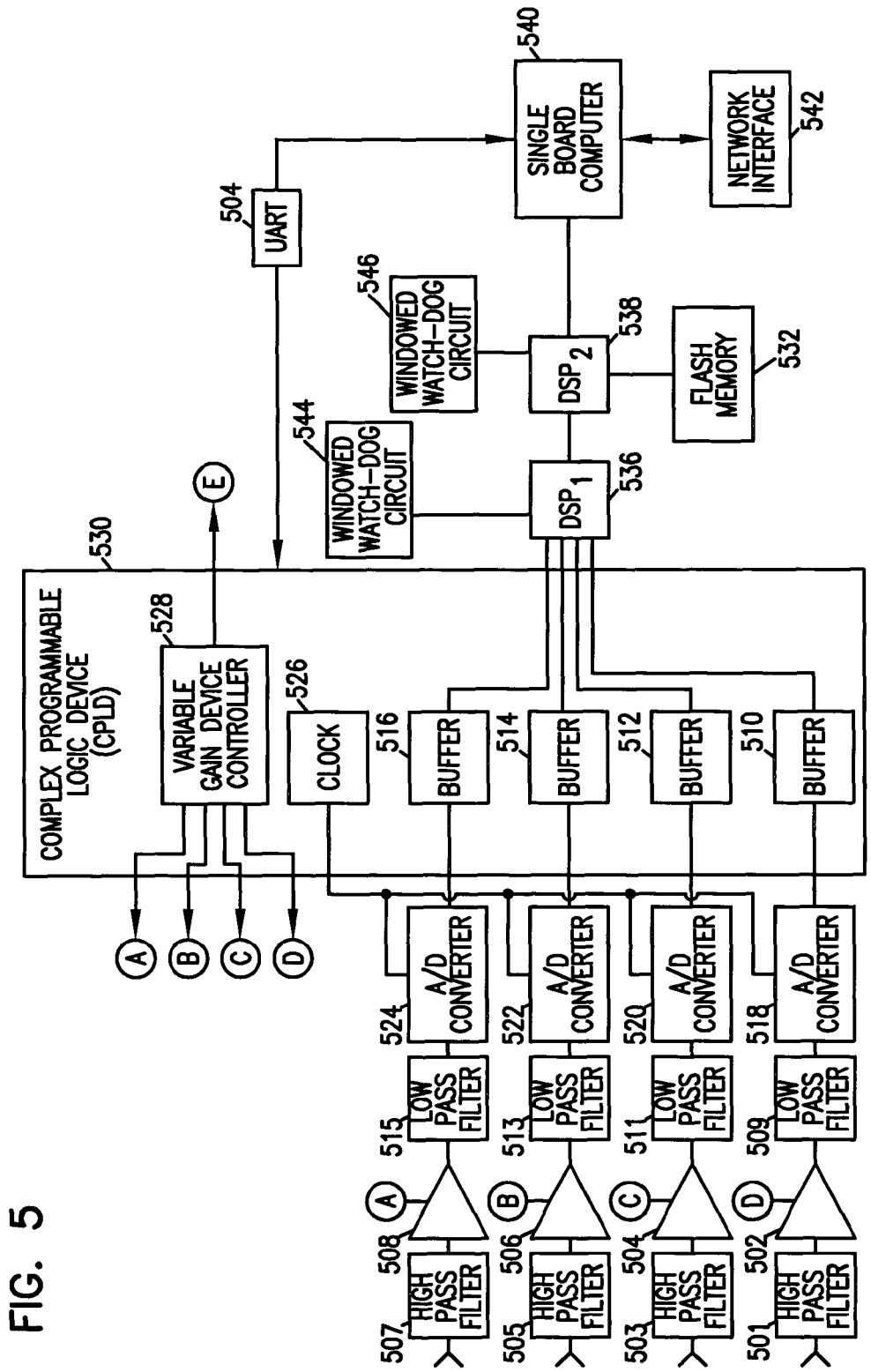
FIG. 5 is a block diagram illustrating a circuit for processing data received at a substation transceiver according to one possible embodiment of the present invention.

Referring to FIG. 5, the exemplary embodiment of the substation processing unit 332 includes four low pass filters 501, 503, 505, and 507, four variable gain devices 508, 510, 512, 514, and 516, four high pass filters 509, 511, 513, and 515, a complex programmable logic device (CPLD) 530, four analog to digital (A/D) converters 518, 520, 522, and 524, first and second digital signal processors (DSP) 536 and 538, two windowed watch-dog circuits 544 and 546, a single board computer 540, flash memory 532, and a modem 542.

The CPLD 530 is programmed to include a clock 526, a variable gain controller 528, and four receive buffers 510, 512, 514, and 516 that are used to buffer the signals received from the distribution line that are being input to the first and second DSPs 536 and 538 for demodulation. As explained in more detail herein, the CPLD 530 may have additional buffers for various functions such as buffering data being transmitted by the substation controller 108. One type of CPLD that can be used is chip no. XC95144XL, which is manufactured by XILINX located in California, U.S.A.

The clock 526 provides a clocking signal to each of the A/D converters 518, 520, 522, and 524. The variable gain controller 528 provides a signal to each of the variable gain devices 502, 504, 506, and 508. In one possible embodiment, the variable gain devices 502, 504, 506, and 508 are op amps that output a signal having an amplitude of about 2.5 Volts.

The flash memory 532 stores the code for the first and second DSPs 536 and 538. The flash memory 532 also stores an error log that records error signals generated by the first and second DSPs 536 and 538.

As explained in more detail herein, the first and second DSPs 514 and 516 demodulate the signals received over the distribution line 106 using frequency shift keying. The second DSP 538 then outputs the demodulated data into the signal board computer 540, which stores the data in the memory (not shown). One type of chip that can be used for the DSPs is chip no. TMS3206711, which is manufactured by Texas Instruments located in Texas, U.S.A.

In operation, an endpoint transceiver 112 generates a signal that embodies data and transmits that signal over the distribution line 106. For exemplary purposes, the endpoint transceiver 112 is in electrical communication with and transmits its signal over the distribution line conductor 302. The signal then propagates through the current transformer 308, along metering loop line 314, through current transformer 320, along input line 326, and into the first input 327.

The signal is conditioned by passing through the high pass filter 501, the first variable gain device 502, and the low pass filter 509. The variable gain device 502 is an amplifier that biases the signal a predetermined amount such as about 2.5 Volts. The high pass and low pass filters 501 and 509 isolate the signal and remove noise. The signal is converted from analog to digital by the first A/D converter 518 and input to the first buffer 510 programmed into the CPLD 530. The buffered signal is input to the first DSP 536. The first DSP 536 performs a first portion of the operations to demodulate the signal and then passes the signal to the second DSP 538, which completes the demodulation process. The demodulated signal is input to the single board computer 540.

Signals transmitted on the transmission conductor 304 similarly propagate through the current transformer 310, along metering line 316, through current transformer 322, along input line 328 and input second input 329. The signals then propagate through the high pass filter 503, through the variable gain device 504, through the low pass filter 511, through the second A/D converter 520 and input the second buffer 512 programmed into the CPLD 530. The signal then is processed by the first and second DSPs 536 and 538, and input to the single board computer 540.

Signals transmitted on the distribution line conductor 306 also similarly propagate through the current transformer 312, along metering line 318, through current transformer 324, along input line 330 and input second input 331. The signals then propagate through the high pass filter 505, through a variable gain device 506, through the low pass filter 513, through an A/D converter 522 and input the second buffer 514 programmed into the CPLD 530. The signal then is processed by the first and second DSPs 536 and 538, and input to the single board computer 540.

The first and second DSPs 536 and 538 monitor each of the distribution line conductors 302, 304, and 306 for each sub-sub-channel 406. Thus, if an endpoint transceiver 112 is transmitting a signal on one of the sub-sub-conductors 302, 304, or 306 and the signal bleeds to the other two conductors, the substation controller 108 will receive three separate signals within the frequency band of the sub-sub-channel 406. The single board computer 540 then determines which of the signals has the greatest amplitude and discards data from the other two signals. An advantage of this embodiment is that a technician installing the endpoint transceiver 112 can quickly connect it to any of the distribution line conductors 302, 304, or 306.

Signals transmitted by the substation controller 108 are fed back into the substation controller 108 and recorded. This feedback provides a historical record of the data actually transmitted onto the distribution line 106. Because the transmitted signal propagates wherever power is distributed, it is also transmitted to a 120 volt outlet in which a power supply (not shown) for the single board computer 540 is plugged. A signal is picked up from the power supply, and is then processed similar to the signals that are transmitted on the distribution line 106 by the endpoint transceivers 112. More specifically, the signal is fed through the high pass filter 507, through the variable gain device 508, through the low pass filter 515, and then through the fourth A/D converter 524. The signal is then buffered 516 by the fourth buffer programmed in the CPLD 530 and input to the first and second DSPs 536 and 538 where it is demodulated.

The first DSP 536 sends a watch-dog signal to the windowed watch-dog timer 544 at a predetermined interval. If the windowed watch-dog timer 544 does not receive a watch-dog signal within the predefined window, it generates and sends a reset signal to the first DSP 536. In one possible embodiment, the window within which the windowed watch-dog circuit 544 looks to receive a watch-dog signal is from about 0.7 seconds to about 1.3 seconds. The second DSP 538 interfaces with the windowed watch-dog timer 545 in a similar manner.

The single board computer 540 is a standard computer board 540 that includes a programmable processor, memory, and various inputs and outputs. One type of single board computer that can be used in Model # EBCTXPLUS-5222B, which is manufactured by WinSystems located in Texas, U.S.A. The single board computer 540 communicates with the second DSP 538 through a data bus 534. In the exemplary embodiment, the data bus 534 is a universal asynchronous receive and transmit (UART) data bus that communicates according to the RS-485 data protocol. The second DSP 538 includes a command processor or decoder that decodes commands received from the single board computer 540 and then either processes the command itself or relays the command to the first DSP 536, clock 526, variable gain device controller 528, or other hardware or firmware element for execution.

Additionally, the single board computer 540 communicates to the outside world through a network interface 542. Examples of possible network interfaces include modems for communication over plain old telephone lines (POTS). Other examples, include hardware and drivers to support communication using the Internet, an Intranet, a wide area network (WAN), a local area network (LAN), satellite, microwave, or any other type of network connection that can be used for communicating data to remote locations, whether the communication is over hardwired lines or is wireless.

Although a certain hardware and software configuration is illustrated in this exemplary embodiment for receiving and processing data signals there are many possible alternative embodiments and the invention can be embodied in any configuration of hardware and/or software that can receive, demodulate, and demultiplex the signals.

Figure 6A:
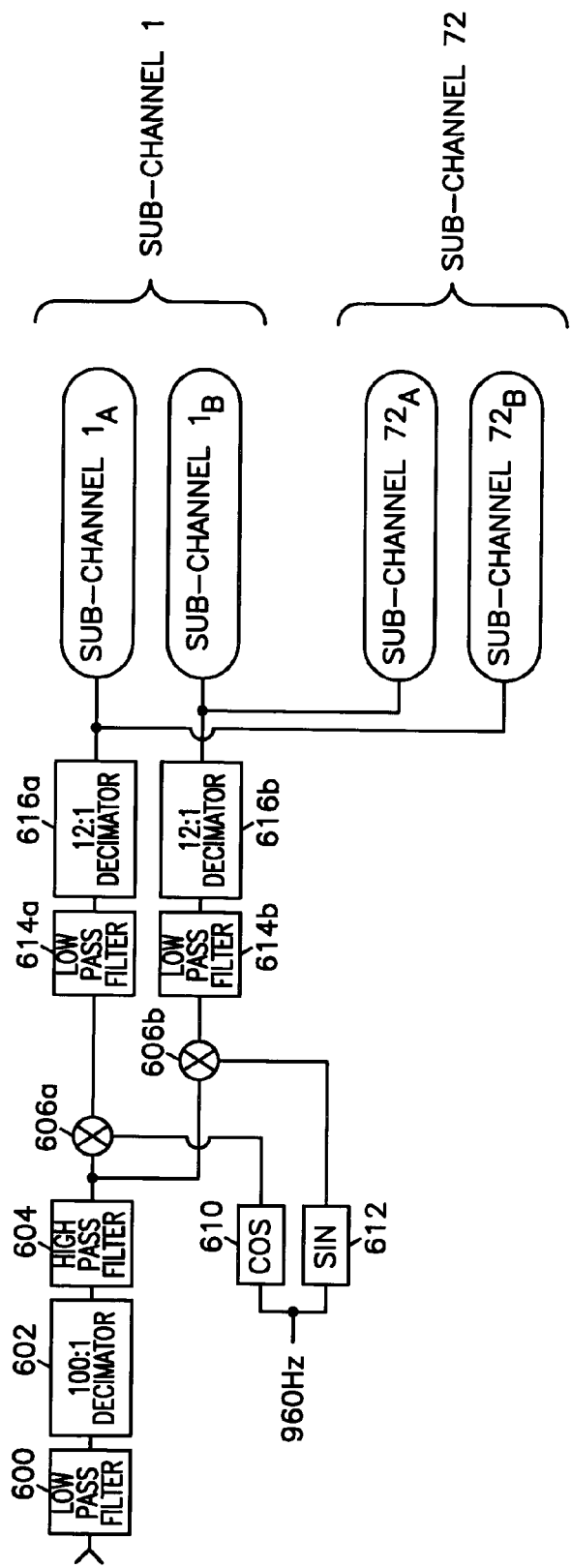
FIGS. 6A-6D is a block diagram illustrating a digital signal processing circuit for demultiplexing and demodulating a plurality of data channels according to one possible embodiment of the present invention.

Referring to FIGS. 4 and 6A, the signal output from the first D/A converter 518 and buffered in the first buffer 510 corresponds to the main channel 402, which in the exemplary embodiment has a bandwidth of about 36 Hz (970 Hz to 1006 Hz). The signal is input to the first DSP 536, where it passes through a low pass filter 600, through a 100:1 decimator 602 and then a high pass filter 604.

In one possible embodiment, the low pass filter 600 has a cutoff frequency of about 1090 Hz and prevents aliasing or the erroneous interpretation of a high frequency component as a lower frequency component as the signal is sampled. The 100:1 decimator 602 changes the sampling rate from about 250,000 samples per second (sps) to about 2,500 sps. The 100:1 decimator 602 reduces the sampling rate by accumulating 200 words. The high pass filter 604 has a cutoff frequency of about 906 Hz and filters all frequencies below 906 Hz, including the 60 Hz component from the alternating current conducted by the transmission line 100.

The signal is then passed to first and second signal branches 606a and 606b. Along the first signal branch 606a, the signal passes through a mixer 608a that combines the signal with a cosine wave 610 having a predetermined frequency. In exemplary embodiment disclosed herein the cosine wave has a frequency of about 960 Hz, which is line locked to the power distribution frequency of the 120/240V input for the SPU 332. An advantage of line locking the frequency of the cosine wave is that it will vary with the frequency (about 60 Hz) of the alternating current carried by the distribution line 106, which is the carrier wave for the signals transmitted by the endpoint transceivers 112. The signal then passes through a low pass filter 614a and then a 12:1 decimator 616a. In one possible embodiment, the low pass filter 614a has a cutoff frequency of about 50 Hz and the 12:1 decimator 618a changes the sampling rate from about 2500 sps to about 208.33 sps.

The signal passed to the second branch 606b is processed in a similar manner passing through a mixer 608b, a low pass filter 614b, and a 12:1 decimator 618b. In the exemplary embodiment, the only difference for the processing in the first branch 606a is that the mixer combines the signal with a sine wave having a frequency of about 960 Hz.

In the exemplary embodiment, the code for the 12:1 decimators 618a and 618b are split between the first and second DSPs 536 and 538. Accordingly, the signals propagating along the first and second signal branches 606a and 606b are passed from the first DSP 536 to the second DSP 538 as they are being processed by the 12:1 decimators 616a and 616b. In another possible embodiment, all of the demodulation steps illustrated in FIG. 6A-6C are performed in a single digital signal processor so long as it has enough processing power and memory.

Figure 6B:
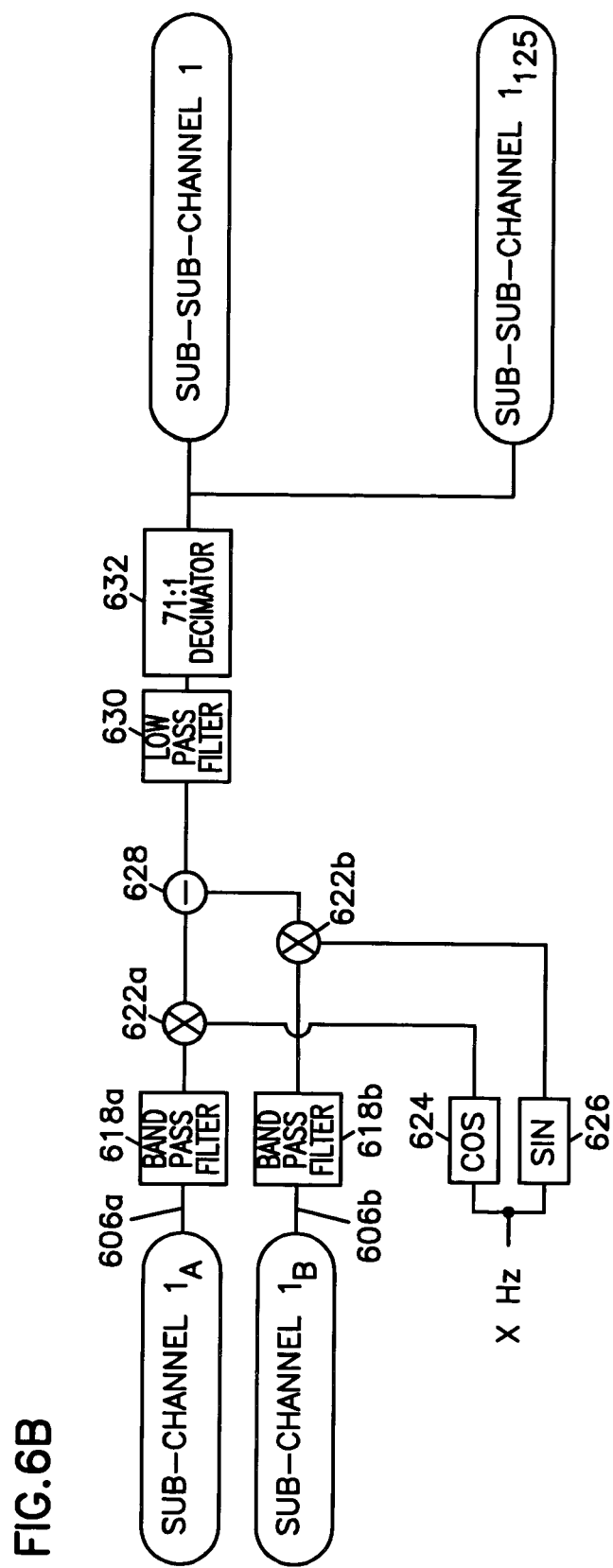
Figure 6C:
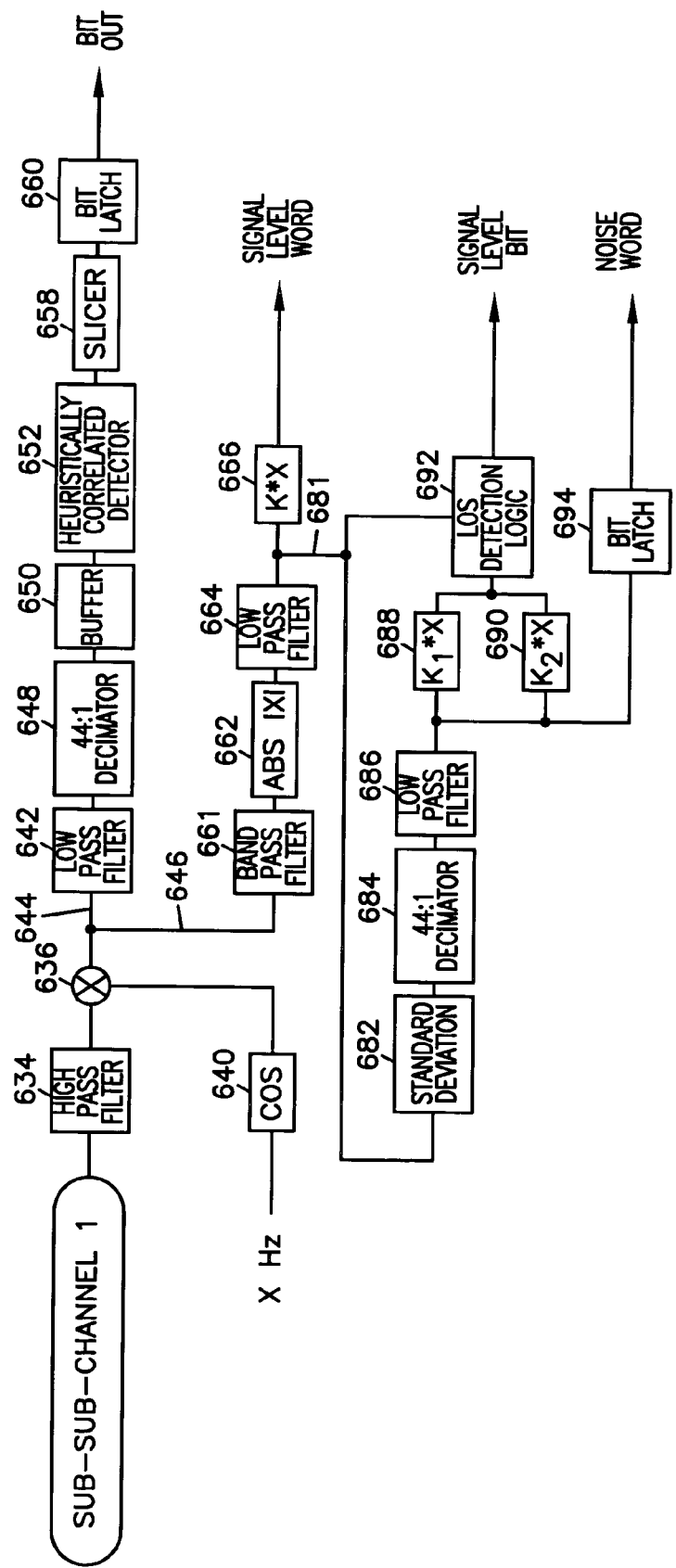

Referring to FIGS. 4 and 6B, the signal output by the 12:1 decimators 616a and 616b are input into 72 parallel sub-channel signal branches, each parallel sub-channel signal branch corresponding a separate sub-channel 404. As it passes through each of the parallel sub-channel signal branches, the signal transmitted along the first signal branch 606a passes through a bandpass filter 618a, through a mixer 622a, and into a subtractor 628. In the exemplary embodiment, the bandpass filter has a lower cutoff frequency of about 10 Hz and an upper cutoff frequency of about 10.5. The mixer 622a mixes the signal with a cosine wave 624 having a predetermined frequency of about 9.8 Hz, which is line locked to the power distribution frequency of the 120/240V input for the SPU 332.

Similarly, the signal transmitted along the second signal branch 606b passes through a bandpass filter 618b, through a mixer 622b, and into the subtractor 628. The primary difference from the first signal branch 606a is that the mixer 622b combines the signal with a sine wave having a frequency of about 9.8 Hz, which is line locked to the power distribution frequency of the 120/240V input for the SPU 332. The subtractor 628 then subtracts the signal processed along the second signal branch 606b from the signal processed along the first signal branch 606a. The signal output from the subtractor 628 is passed through a low pass filter 630 and a 71:1 decimator 632. The low pass filter 630 has a cutoff frequency of about 0.7 Hz and further isolates the data signal. The 71:1 decimator further reduces the sampling rate from about 208.33 sps to about 2.93 sps.

In the exemplary embodiment, the bandpass filter 618b has a lower cutoff frequency of about 10 Hz and an upper cutoff frequency of about 10.5. The mixer 622b mixes the signal with a sine wave 626 having a predetermined frequency of about 9.8 Hz, which is line locked to the power distribution frequency of the 120/240V input for the SPU 332.

Each of the parallel sub-channel signal branches is substantially the same as the illustrated block diagram for sub-channel 1. The primary difference is that the frequency input to the mixer is incremented by about 0.5 Hz for each successive sub-channel 404. The frequency input to the mixer is line locked to the power distribution frequency of the 120/240V input for the SPU 332. Similarly, the maximum and minimum cutoff frequencies for the bandpass filters 618 are increased by about 0.5 Hz for each successive sub-channel 404. Thus, for example, the second sub-channel has a mixer frequency of about 10.3 Hz and the bandpass filter has cutoff frequencies of about 10.5 Hz and about 11.0 Hz. In this exemplary embodiment, the seventy-second sub-channel has a mixer frequency of about 45.3 Hz and the bandpass filter has cutoff frequencies of about 45.5 Hz and about 50.0 Hz.

Referring to FIGS. 4 and 6C, the signal output by the 71:1 decimator 632 for each parallel sub-channel signal branch is input into 125 parallel sub-sub-channel signal branches. Each parallel sub-sub-channel signal branch corresponds to a separate sub-sub-channel 406. Given the architecture in this exemplary embodiment, there are about 9000 parallel sub-sub channel signal branches.

The signal input to the first sub-sub-channel signal branch passes through a high pass filter 634, a mixer 636, and a low pass filter 642. In the exemplary embodiment, the high pass filter 634 has a cut off frequency of about 0.198 Hz, and the mixer 652 combines the data signal with a cosine wave 640 having a frequency of about 0.184 Hz, which is line locked to the power distribution frequency of the 120/240V input for the SPU 332.

After passing through the low pass filter 642, the data signal is output to a first signal branch 644 and a second signal branch 646. The signal passed to the first signal branch 644 is passed through a 44:1 decimator 648, which decreases the sampling rate from about 2.93 sps to about 0.0667 sps.

Figure 6D:
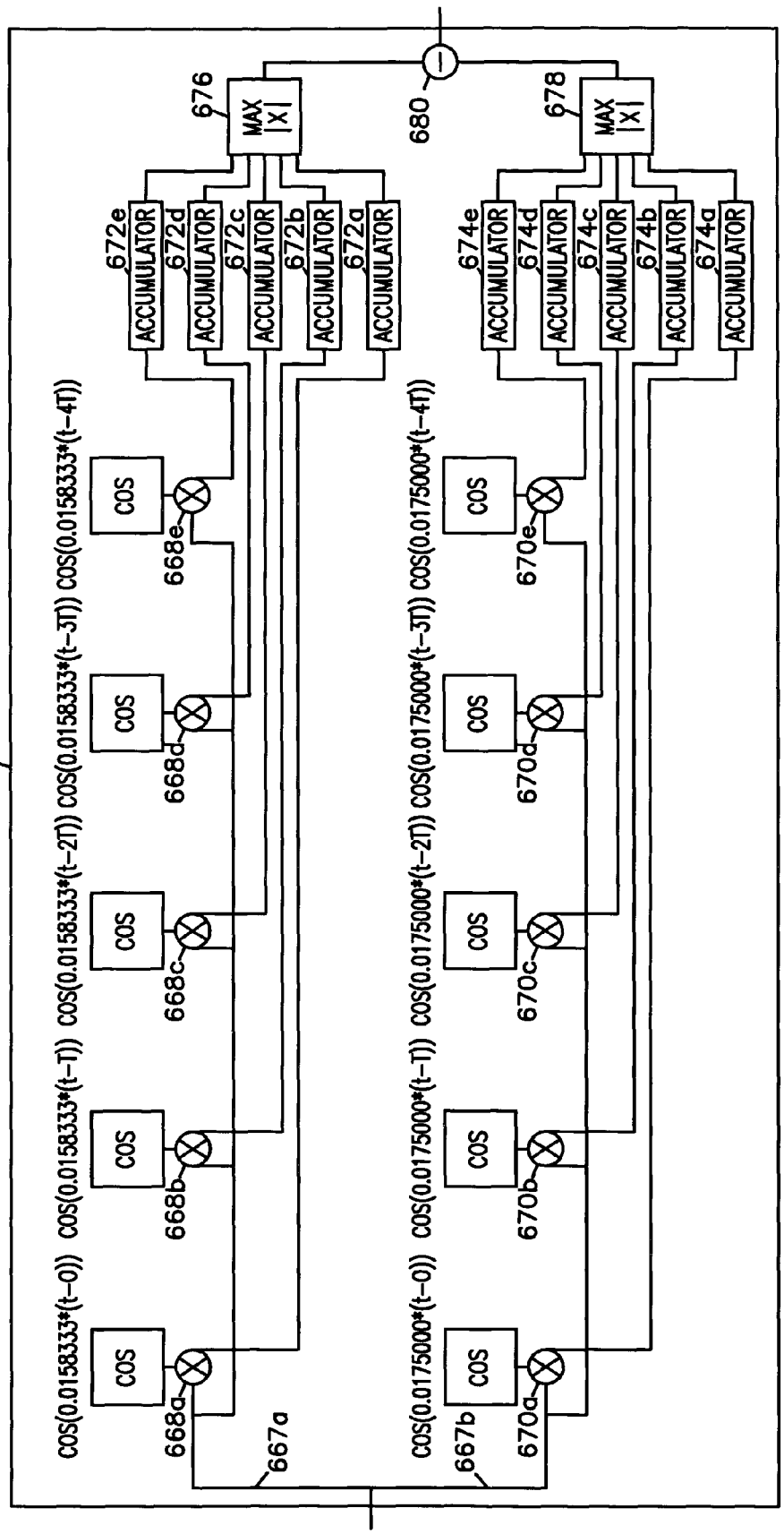

Referring to FIGS. 6C and 6D, the decimated signal passed into a heuristically correlated detector 652, which estimates the phase of the signal received from the endpoint transceiver 112. The signal propagates onto two signal paths 667a and 667b. On the first signal branch, the signal is input to five multipliers 668a-668e. The first multiplier 668a mixes the signal with a cosine wave having a phase calculated according $\cos(0.01583333(t-0))$. The second multiplier 228b mixes the signal with cosine wave having a phase calculated according to $\cos(0.0158333(t-T))$ where t is time and T is the sample rate of the signal output by the 44:1 decimator 648. The third multiplier 668c mixes the signal with cosine wave having a phase calculated according to $\cos(0.0158333(t-2T))$ where t is time and T is the sample rate. The fourth multiplier 668d mixes the signal with cosine wave having a phase calculated according to $\cos(0.0158333(t-3T))$ where t is time and T is the sample rate. The fifth multiplier 668e mixes the signal with cosine wave having a phase calculated according to $\cos(0.0158333(t-4T))$ where t is time and T is the sample rate. In the exemplary embodiment, the samples output by the multipliers 668a-668e are accumulated by the accumulators 672a-672e, respectively, for about a 20-minute period, which results in the collection of about 80 samples. The sample from each of the accumulators 672a-672e is input to a maximum value function 676. The maximum value function 676 then determines which of the five samples received from the accumulators 672a-672e has the greatest value and inputs that greatest value to the subtractor 680. The maximum value function 676 discards the remaining samples.

Similarly, the signal propagating along the second signal branch 667b is input to multipliers 670a-670e. The first multiplier 670a mixes the signal with a cosine wave calculated according to $\cos(0.0175000(t-0))$. The second multiplier 670b mixes the signal with a cosine wave calculated according to $\cos(0.0175000(t-T))$, where T is the sampling rate of the signal output by the 44:1 decimator 648. The third multiplier 670c mixes the signal with a cosine wave calculated according to $\cos(0.0175000(t-2T))$, where T is the sampling rate of the signal output by the 44:1 decimator 648. The fourth multiplier 670b mixes the signal with a cosine wave calculated according to $\cos(0.0175000(t-3T))$, where T is the sampling rate of the signal output by the 44:1 decimator 648. The fifth multiplier 670b mixes the signal with a cosine wave calculated according to $\cos(0.0175000(t-4T))$, where T is the sampling rate of the signal output by the 44:1 decimator 648. In the exemplary embodiment, the samples output by the multipliers 670a-670e are accumulated by the accumulators 674a-674e, respectively, for about a 20-minute period, which results in the collection of about 80 samples. The sample from each of the accumulators 674a-674e is input to a maximum value function 678. The maximum value function 678 then determines which of the five samples received from the accumulators 674a-674e has the greatest value and inputs that greatest value to the subtractor 680. The maximum value function 678 discards the remaining samples. The subtractor then determines the difference between the samples received from the maximum value functions 676 and 678 and outputs the difference to the slicer 658.

Alternative embodiments of the heuristically correlated detector 65 are possible. For example, it can estimate the phases of the signal received by the endpoint transceiver more accurately, by mixing the signal propagating along each of the signal branches with more than five cosine functions having the phase of the function increases in smaller increments. For example, it could increment the phase by about 0.5T rather than about 1T. The heuristically correlated detector also could estimate the phases of the signal less accurately by mixing signals with fewer cosine functions having the phase function for each cosine function increased in greater increments.

Referring back to FIG. 6C, the slicer 658 limits each sample received from the heuristically correlated detector between two predetermined amplitude boundaries, which increases the signal-to-noise ratio. In one possible embodiment, the upper boundary is a voltage level of about +1 volts and the lower boundary is voltage level of about −1 volts. In the exemplary embodiment, the slicer 658 reads the sliced samples at about 20-minute intervals, although other embodiments will read the sliced samples at other intervals.

A bit latch 660 is clocked and synchronized with the slicer 658 so that it is set by the last bit at the same interval at which the slicer 658 reads the sliced sample. Again, in the exemplary embodiment, the interval is about 20 minutes although other embodiments might have other intervals. Again other embodiments might if the last bit has a positive value, the bit latch 660 sets a logical "1". If the last bit has a negative value, the bit latch 660 sets a logical "0". The bit output by the latch 660 is then input to the single board computer 540, which stores the data in memory.

The signal passed to the second signal branch 646 passes through a bandpass filter 661, which in the exemplary embodiment has a pass band from about 15.08333 mHz to about 18.25 mHz. The signal is then passed through an absolute value function 662 that rectifies the signal and through a low pass filter 664, and through a scaling function 666. In the exemplary embodiment, the low pass filter 664 that has a cut off frequency that is adjustable in the range from about 250 µHz to about 1.0 mHz. The cut off frequency is adjusted until the low pass filter 664 smoothes the signal being processed and the second DSP 538 outputs a signal strength word that accurately identifies the strength of the signal being received from the endpoint transceiver 112.

The scaling function 666 scales the amplitude of the signal within the bandwidth defined by the low pass filter 664. In the exemplary embodiment, it scales the amplitude of the signal by a factor of about $9.587 \times 10^{-6}$*(Gain/100), where Gain is the gain of the variable gain device 502, 504, or 506 that provides an input for the signal being processed by the scaling function 666. The scaled signal is a binary signal strength word that corresponds to the strength or amplitude of the signal received from the endpoint transceiver 112. The single board computer 540 can selectively obtain the signal strength word.

The signal output by the low pass filter 664 is also input to a fault detection signal branch 681 that determines whether the substation controller 108 fails to receive a signal from the endpoint transceiver 112 on that sub-sub channel 406 or whether the signal that it is receiving is too noisy. The signal passes through a standard deviation function 682. The signal has a D.C. bias, and the standard deviation function 682 calculates the standard deviation of the signal's amplitude, which varies around the D.C. bias.

The signal output by the standard deviation function is input to a 44:1 decimator, which reduces the sampling rate from about 2.93 sps to about 0.0667 sps. The signal then passes through a low pass filter 686 that has a cut off frequency that is adjustable between about 1 µHz to about 100 µHz. The cut off frequency is adjusted until the low pass filter 686 smoothes the signal being processed and the second DSP 538 outputs a signal strength bit and a noise word that accurately indicates lost and noisy sub-sub-channels 406, respectively, with a desired degree of accuracy.

The signal is then input to a high-limit scaling-function 688 and a low-limit scaling function 690. The high-limit scaling function 688 scales the amplitude of the signal by the factor 240*(Gain/100), where Gain is the gain of the variable gain device 502, 504, or 506 that provides an input for the signal being processed by the scaling function 688. The constant (240 in the exemplary embodiment) used in the scaling function 688 is set so that the output of the scaling function 688 is about 6 sigma. The output of the scaling function 688 is an upper limit. Similarly, the low-limit scaling function 690 scales the amplitude of the signal by the factor 120*(Gain/100), where Gain is the gain of the variable gain device 502, 504, or 506 that provides an input for the signal being processed by the scaling function 690. The constant (120 in the exemplary embodiment) used in the scaling function 690 is set so that the output of the scaling function 690 is about 3 sigma. The output of the scaling function 690 is a lower limit.

The upper and lower limits are input to LOS detection logic 692, which compares the unscaled signal strength word output by the low pass filter 664 to the upper and lower limits output by the scaling functions 688 and 690. The LOS detection logic 692 outputs a signal strength bit indicating a lost channel if the strength of the signal received on the sub-sub-channel 406, as output by the low pass filter 664, first goes above the upper limit and then below the lower limit or if the strength of the signal never goes above the upper limit. The LOS detection logic 692 outputs a signal strength bit indicating a signal is being received on the sub-sub-channel 406 if the strength of the signal as output by the low pass filter 664 goes above the upper limit and stays above the upper limit. The LOS detection logic 692 also outputs a signal strength bit indicating a signal is being received on the sub-sub-channel 406 if the strength of the signal as output by the low pass filter 664 goes above the upper limit and then falls below the upper limit but not below the lower limit. The single board computer 540 selectively obtains the bit output by the LOS detection logic 692.

The output of the low pass filter 686 is also input to a bit latch 694, which latches the binary word output by the low pass filter 686. The value of this word is the standard deviation and corresponds to the amount of noise present in the signal received on the sub-sub-channel 406. The single board computer 540 selectively obtains the noise word latched by the bit latch 694.

The single board computer 540 stores in memory the signal strength word received from the scaling function 666, the signal strength bit output by the LOS detection logic 692, and the noise word output by the bit latch 694. If the single board computer 540 does not receive the signal strength bit from the LOS detection logic 692 and it determines that there should be an endpoint transceiver 112 sending a signal on that particular sub-sub-channel 406, it can generate an error. In one possible embodiment, the single board computer 540 can then send a command to find the missing endpoint transceiver 112. In another possible embodiment, the single board computer 540 can send the signal strength bit or other data item to the central office 334 either indicating a possible failure in the distribution plant or identifying the endpoint transceiver 112 as failed so that it can be repaired or replaced.

Additionally, one can use the signal strength word output by the scaling function 666 for diagnostic purposes. For example, if there is a signal strength word, but the scaled value is not within the predetermined range, one might adjust the biasing of the variable gain device 502, 504, or 506. In yet another possible embodiment, the single board computer 540 automatically instructs the variable gain device controller 528 in the CPLD 530 to adjust the bias of the variable gain device 502.

Other possible embodiments might include different combinations of bits or binary words output by the LOS detection logic 692. In one possible embodiment, the LOS detection logic 692 outputs only a single signal strength bit. In other embodiments, the LOS detection logic 692 outputs binary words or other combinations of bits and/or flags. Yet another possible embodiment does not include the fault detection signal branch 681. This embodiment outputs only the signal strength word from the scaling function 666 and the single board computer 540 uses this information to determine the presence or absence of a signal from the endpoint transceiver 112. Other possible embodiments do not include the separate signal branch 646 at all.

Again, although an exemplary embodiment of digital signal processing logic is illustrated and described herein, many other embodiments for demodulating received signals are possible. For example, the demodulating and demultiplexing can be performed using any combination of hardware and/or software and any type of multiplexing/demultiplexing and modulation/demodulation schemes that can simultaneously process signals received from multiple endpoint transceivers 112.

Each of the parallel sub-sub-channel signal branches is substantially the same as the illustrated block diagram for sub-sub-channel 1. The primary difference is that the frequency input to the mixer is incremented by about 0.004 Hz for each successive sub-sub-channel 406. The frequency input to the mixer is line locked to the power distribution frequency of the 120/240V input for the SPU 332. Similarly, the maximum and minimum cutoff frequencies for the high pass filters 634 are increased by about 0.004 Hz for each successive sub-sub-channel 406. Thus, for example, the second sub-sub-channel has a mixer frequency of about 0.188 Hz and the high pass filter has a cutoff frequency of about 0.202 Hz. In this exemplary embodiment, the one hundred twenty-fifth sub-sub-channel has a mixer frequency of about 0.680 Hz and the high pass filter has cutoff frequency of about 0.694 Hz.

Figure 7:
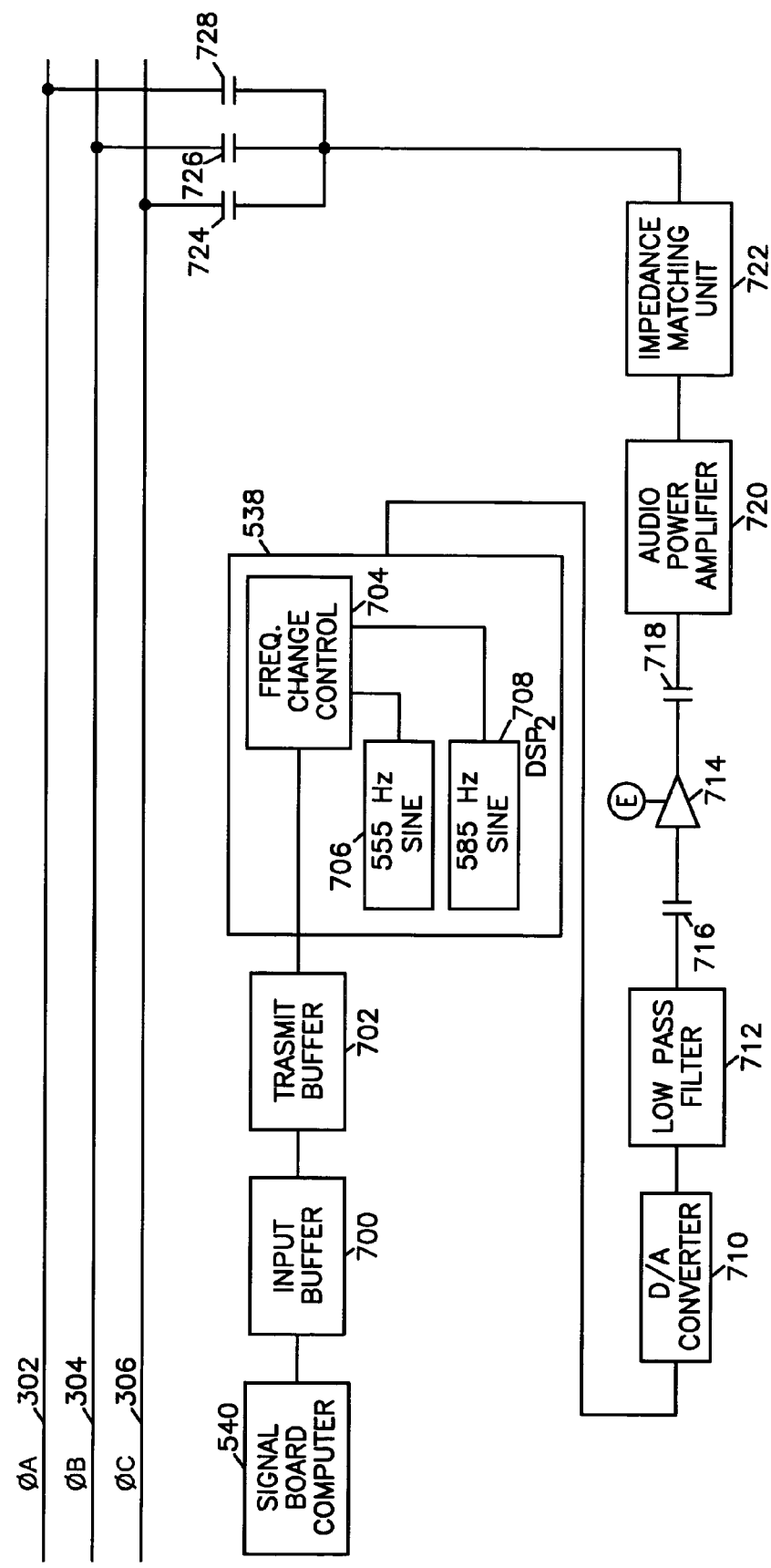
FIG. 7 is a block diagram illustrating components of a substation transceiver for transmitting a signal onto a power distribution network according to one possible embodiment of the invention.

Referring to FIG. 7, when transmitting a signal to the endpoint transceivers 112, the single board computer 540 generates a data packet that contains a message. The data packet is then buffered by an input buffer 700 and a transmit buffer 702, both of which are 60-second buffers that hold the data for one minute.

The input and the transmit buffers 700 and 702 form a ping-pong buffering scheme. The data passes first through the input buffer 700 and then through the transmit buffer 702. When the data is received at the transmit buffer 702, it sends a message to the input buffer 700 to delete the data from the input buffer register. This buffering scheme prevents the loss of data.

The data is held in the transmit buffer 702 for about 60 seconds and then input to the second DSP 538 where it is modulated using a single channel, binary frequency shift keying scheme. Specifically, the data passes through a frequency change function 704. The frequency change function 704 determines whether the frequency shifts from one frequency to another. If the frequency shifts, the frequency change function 704 determines that the data bit is a logical "1". If the frequency does not shift, the frequency change function 704 determines that the data bit is a logical "0". In the exemplary embodiment, the frequency change function determines whether the data bit is a logical "1" or "0" depending on whether the frequency shifts between frequencies of about 555 Hz and about 585 Hz.

The data is output from the second DSP 538 and input to a digital to analog (D/A) converter 710, which outputs a modulated transmit signal to a low pass filter 712. The low pass filter 712 has a cut-off frequency of about 1.2 KHz and smoothes the modulated transmit signal. The modulated transmit signal then passes through a variable gain device 714 that is electrically isolated by capacitors 716 and 718. The variable gain device 714 is biased by the variable gain device controller 528 of the CPLD 530. The variable gain device 714 is biased to set the modulated transmit signal at a predetermined voltage level. In one possible embodiment, the variable gain device 714 sets the modulated transmit signal to a voltage level of about 1.4 Volts RMS.

The modulated transmit signal from the variable gain device 714 is then amplified. In one exemplary embodiment, the modulated transmit signal is amplified by a power audio amplifier 720 capable of amplifying a signal by about 400 Watts or more. One type of power audio amplifier that can be used is model K1, which is manufactured by Crown Audio, Inc., of Indiana, U.S.A. After it is amplified, the modulated transmit signal is passed through an impedance matching unit 722, and then is simultaneously transmitted onto each of the distribution line conductors 302, 304, and 306 through the isolation capacitors 724, 726, and 728, respectively. The modulated transmit signal simultaneously propagates along each of the transmission conductors 302, 304, and 306 to each of the endpoint transceivers 112.

To prevent insertion loss and distortion of the modulated transmit signal, the impedance matching unit 722 matches the impedance between the output of the audio power amplifier 720 and the distribution line conductors 302, 304, and 306. One skilled in the art will appreciate that the impedance matching unit 722 includes an inductance-capacitance network (not shown).

Although a certain hardware and software configuration for transmitting and processing data signals is illustrated in this exemplary embodiment, there are many possible alternative embodiments and the invention can be embodied in any configuration on hardware and/or software that can transmit and modulate the transmission signals.

Figure 8:
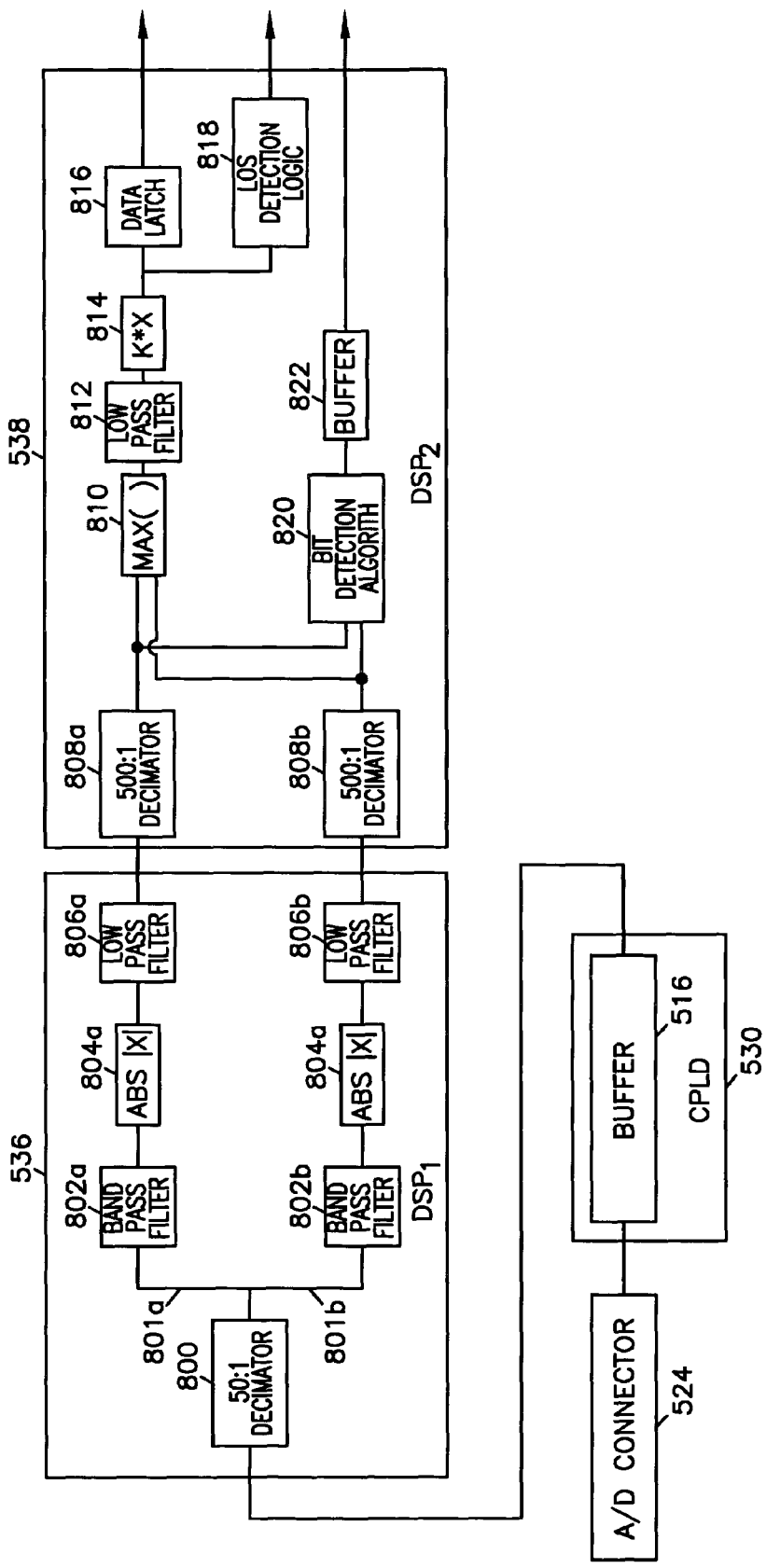
FIG. 8 is a block diagram illustrating a digital signal processing circuit for demodulating a transmission signal fed back into a substation transceiver according to one possible embodiment of the present invention.

As discussed above, and referring to FIGS. 5 and 8, the modulated transmit signal propagates to the 120/240V input for the SPU 332. The voltage level is taken from the power supply, conditioned, input to the fourth A/D converter 524, buffered 516 in the fourth buffer programmed into the CPLD 530, and then input to the first DSP 536.

Within the first DSP 536, the transmit signal is passed through a 50:1 decimator, which converts the sample rate of the signal from about 500,000 samples per second (sps) to about 10,000 sps. The signal then propagates onto two signal branches 801a and 801b. Within the first signal branch 801a, the signal first passes through a bandpass filter 802a having a first predefined pass band. In one possible embodiment, the bandpass filter 802a has a lower cutoff frequency of about 575 Hz and an upper cutoff frequency of about 595 Hz. It isolates signals having a frequency of about 585 Hz. In other embodiments, the bandpass filter 802a has different bandpasses.

The signal then flows through an absolute value function 804a, which rectifies the signal, and then through a low pass filter 806a, which has a cutoff frequency of about 5 Hz. The low pass filter 806a smoothes the rectified signal. The rectified signal passes through a 500:1 decimator 808a, which changes the sample rate from about 10,000 sps to about 20 sps. The signal is then passed from the first DSP 536 to the second DSP 538.

The signal passed along the second signal branch 801b is processed in a substantially similar method. It flows through a bandpass filter 802b, an absolute value function 804b, a low pass filter 806b, and then a 500:1 decimator 808a. The primary difference from the first signal branch 801a is that the bandpass filter 802b has a second predefined pass band. In one possible embodiment, the bandpass filter 802b has a lower cutoff frequency of about 545 Hz and an upper cutoff frequency of about 565 Hz. It isolates a signal having a frequency of about 555 Hz. In other embodiments, the bandpass filter 802b has different bandpasses.

The signal output from each signal branch 801a and 801b is input to a max signal function 810, which selects the signal that has the largest amplitude and then passes the larger of the two signals through a low pass filter 812. The low pass filter 812 further smoothes the signal so that a steady-state signal strength can be determined. The low pass filter 812 has a cutoff frequency of about 100 mHz. The filtered signal then is passed through a scaling function 814 that biases the voltage level of the signal by a predetermined factor. In one possible embodiment, the predetermined factor, which equals $1.1 \times 10^{-4} * (Gain/100)$, where Gain is the gain of the variable gain device 508.

The scaled signal is input to both a data latch 816 and a loss-of-signal (LOS) detection logic 818. In one possible embodiment, the data latch 816 operates in a substantially similar manner as the data latch 668. The LOS detection logic 818 compares signal strength to a predetermined value and outputs a signal strength bit indicating whether the signal strength is below the predetermined value. Additionally, the data latch 816 and the LOS detection logic 818 interface with the single board computer 540 in a substantially similar manner as the data latch 668 and the LOS detection logic 692. The primary difference is that the single board computer 540 uses the output of the data latch 816 and the LOS detection logic 818 to determine whether the substation controller 108 is properly transmitting a signal onto the distribution line 106 as opposed to determining whether a signal is being properly received from the endpoint transceiver 112. The data latch 816 and LOS detection logic 818 can have similar alternative embodiments as the data latch 668 and the LOS detection logic 692, respectively.

The signal output from each signal branch 801a and 801b also is input to a bit detection algorithm 820, which determines whether the data bit is a logical "1" or "0". In one possible embodiment, the bit detection algorithm 820, which is programmed into the second DSP 538, receives the signal output from each signal branch 801a and 801b. The bit detection algorithm then calculates which signal has a greater amplitude or value. If the signal that has the greater amplitude changes, the bit detection algorithm 820 determines that the frequency changed and corresponds to a logical "1" and outputs a high or "1" bit. If the signal that has the greater amplitude does not change, the bit detection algorithm 820 determines that there is not change in the frequency, which corresponds to a logical "0" and outputs a low or "0" bit. The bits output by the bit detection algorithm 820 are input to a buffer 822. In one possible embodiment, the buffer 822 is a 60-second buffer that accumulates data in one-minute increments and then outputs the data to the flash memory 532 where it is stored.

In one possible embodiment, the flash memory 532 stores the data transmitted by the substation controller 108 for a predetermined period of time, such as 4.5 days. As new data is stored in the flash memory 532, it overwrites oldest data. The data is retrieved from the flash memory 532 upon receiving a fetch command from the single board computer 540. In one possible embodiment, the single board computer 540 generates a fetch command upon receiving instructions from a user.

Although and exemplary embodiment of digital signal processing logic is illustrated and described herein, many other embodiments for modulating a data signal for transmission are possible. For example, modulation can be performed using any combination of hardware and/or software and any type of modulation scheme that is compatible with the endpoint transceivers 112.

Figure 9:
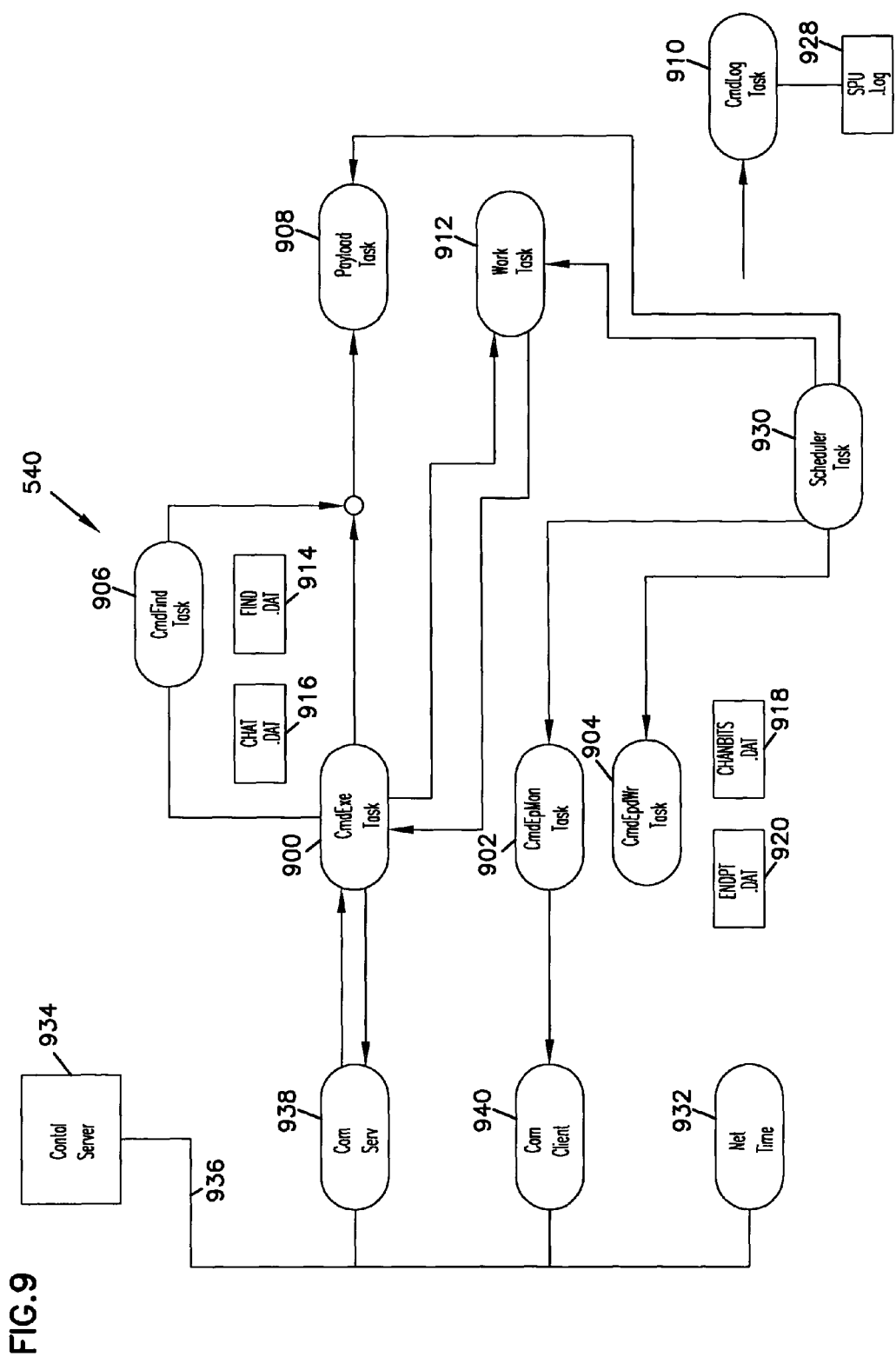
FIG. 9 is a flowchart illustrating operation of at least a portion of the commands programmed into a computer illustrated in FIG. 5.

Referring to FIG. 9, the single board computer 540, which has a preemptive operating system, communicates with a control server 934 via a data communication link 936 such as an Ethernet network. In the exemplary embodiment, the controller server 934 is centrally located in the central office 334 and communicates with single board computers located at several different substations. The control server 934 generates commands and forwards them to the single board computer 540. The single board computer 540 then assembles the commands into data packets, and the substation controller 108 relays the commands to the endpoint transceivers 112. The control server 934 also sends commands to the single board computer 540 instructing the computer 540 to upload data to the control server 934.

The code executed by the single board computer 540 is organized into tasks. In the exemplary embodiment, there are three tasks that control communication with the data communication link 936. These tasks are the Com Serv task 938, the Com Client task 940, and the Net Time task 932.

The control server 934 communicates with the single board computer 540 using a metalanguage such as XML. The Com Serv task 938 is a command processor that receives commands and data from the control servers 934. The commands and data that it receives are in XML. The Com Serv task 938 then parses the commands into a predetermined data structure that is understandable by the operating code executed by the single board computer 540. In the exemplary embodiment, the Com Serv task 938 receives and processes all of the commands that communicated from the control server 934 to the single board computer 540.

Additionally, the Com Serv task 938 processes data for uploading to the control server 934 by converting it to XML and then transmitting it to the control server 934 over the data communication link 936. With the exception of certain data processed and transmitted by the Com Client task 940, all of the data transmitted to the Control server 934 is processed and transmitted by the Com Serv task 938.

In the exemplary embodiment, the Com Client task 940 converts certain data to XML and then transmits it to the control server 934. In the illustrated embodiment, the Com Client task 940 processes and transmits messages and data that are not specifically requested by the control server 934 or otherwise scheduled for period transmission to the control server 934. An example includes a message that the status of a sub-sub-channel 406 was changed to Lost, indicating that substation controller 108 failed to receive a signal from the endpoint transceiver 112 assigned or mapped to that sub-sub-channel 406. In one possible embodiment, the Com Client task 940 reports the Lost status to the control server 934 if the status of the sub-sub-channel is not restored in a predetermined amount of time. In another embodiment, the Com Client task 940 reports the Lost status to the control server 934 as soon as the Lost status of the sub-sub-channel 406 is generated, which permits quick identification of failures, including the type and location of the error. It also permits the quick dispatch of technicians and/or engineers for repair.

The Com Client task 940 also process and transmits messages and data requested by the control server 934 in certain circumstances. In the exemplary embodiment, the Com Client server 940 processes and transmits data that takes more than a significant amount of time to generate when requested from the control server 934. An example of such a command includes a request by the control server to rebuild the table (discussed herein with respect to the CHAT.DAT data file 916) allocating each of the endpoint transceivers 112 to a particular sub-sub channel 406. In this exemplary embodiment, a significant amount of time lapses between the time the single board computer 540 requests information or an action and the time the single board computer 540 responds to the request or acknowledges the action.

The code in the single board computer 540 defines on a command-by-command basis, whether the Com Serv task 938 or the Com Client task 940 processes and transmits data to the control server 934. In this embodiment, a table stores a list of commands executable by the single board computer 540 and identifies either the Com Serv task 938 or the Com Client task 940 as the task responsible for sending the requested information or acknowledgement of the requested action to the control server 934.

The Net Time task 932 retrieves the current time from a global time server that provides an accurate time source. The global time server retrieves the current time based on Universal Time Coordinated (UTC) from a source such as the Global Positioning System (GPS) or a DCF77 signal, which is a radio clock signal generated by an atomic clock. In the exemplary embodiment, the global time server is located remotely 102 and is connected to the single board computer 540 via the data communication link 936. Additionally, the single board computer 540 is programmed to adjust the UTC for the time zone served by the distribution substation 102 and for daylight savings time, if time is adjusted for daylight savings time in the geographic region served by the distribution substation 102. In an alternative embodiment, the global time server is programmed to adjust the UTC for the time zone served by the distribution substation 102 and for daylight savings time, if time is adjusted for daylight savings time in the geographic region served by the distribution substation 102.

In the exemplary embodiment, the global time server retrieves the UTC in a predetermined interval such as once per day. In turn, the Net Time task 932 retrieves the time, which is adjusted as appropriate, in a predetermined interval such as once per day. The Net Time task 932 has a clock function that tracks the time and is recalibrated to the time retrieved from the global time server. In other embodiments, the global time server retrieves and adjusts the time more or less frequently than once per day and the Net Time task 932 retrieves the time from the global time server more or less frequently than once per day. For example, the global time server can retrieve the UTC in intervals such as 5 minutes. Similarly, the Net Time task 932 can retrieve the time from the global time server in intervals such as 5 minutes.

The single board computer 540 is also programmed with a plurality of tasks for executing a variety of functions and stored data files. In the exemplary embodiment, these tasks include a CmdExe task 900, a Payload task 908, a Work task 912, a Scheduler task 930, CmdEpMon task 902, a CmdEpdWr task 904, a CmdLog task 910, and a CmdFind task 906. Data files include a CHAT.DAT file 914, a FIND.DAT file 916, an ENDPT.DAT file 920, a CHANBITS.DAT file 918, and a SPU.LOG file 928.

The CmdExe task 900 executes all of the tasks received and processed by the Com Serv task 938. The CmdExe task 900 executes commands requesting data to be uploaded to the control server 934. The CmdExe task 900 also either executes (or initiates execution of commands by other tasks) requesting a change in the operating parameters of the single board computer 540. Examples include reporting lost endpoint transceiver 112 to the control server 934, initiating commands to find a new or a lost endpoint transceiver 112, commands to reassign an endpoint transceiver 112 from one sub-sub-channel 406 to another sub-sub-channel 406, and settings for operating parameters of the first and/or second DSPs 536 and 538.

The Payload task 908 interfaces with the CPLD 530 and assembles each command intended for the endpoint transceivers 112 into a data packet that is decoded by the endpoint transceivers 112. The Payload task 908 outputs the data packet to the CPLD 530, which buffers the data 700 and 702. The data packet is then transmitted to the endpoint transceivers 112 as discussed herein in more detail.

The Work task 912 interfaces with the CPLD 530 and the first and second DSPs 536 and 538. It sends instructions to the variable gain controller 528 to change operating parameters of the first and second digital signal processor 536 and 538, such as the gain of the various variable gain devices 502, 504, 506, 508, and 714. It also sends instructions to retrieve log files from the flash memory 532, the updated time base, the signal strength bits from the scaling function 666 and the data latch 816, the signal strength bits corresponding to signal strength from the LOS detection logics 692 and 818, and the noise word from the bit latch 694.

The CmdEpdWr task 904 interfaces with and retrieves data from the second DSP 538 that the endpoint transceivers 112 transmitted. In the exemplary embodiment, it retrieves the data bit from the bit latch 660 about once every 20 minutes. When retrieving the data bit, the CmdEpdWr task 904 actually retrieves a bit from the bit latch 660 for the signal received from each of the three distribution line conductors 302, 304, and 306. It determines which of the distribution line conductors 302, 304, or 306 has the strongest signal strength and disregards the bits detected on the other two distribution line conductors. In the exemplary embodiment, the CmdEpdWr task 904 determines which distribution line conductor 302, 304, or 306 has the strongest signal by comparing the signal strength word output by the scaling function 666 along the signal path 646 of the second DSP 538.

After the data bit from the strongest distribution line conductor 302, 304, or 306 is selected, the CmdEpdWr task 904 performs an error correction algorithm. In the exemplary embodiment, the CmdEpdWr task 904 executes a Bose Chaudhuri Hocquengham (BCH) code to correct errors in the data bits selected from the bit latch 660. After error correction is complete, the data bit is stored in the data file ENDPT.DAT 918.

The CHANBITS.DAT data file 918 stores a table that has a record for each of the sub-sub-channels 406. In the exemplary embodiment, each record in the table has an entry identifying the sub-sub-channel 406 to which it corresponds, the serial number of the endpoint transceiver 112 assigned to the sub-sub-channel 406, and fields to store 63 data bits. Each endpoint transceiver 112 is assigned a unique identification (I.D.) such as a serial number that can be formed with numbers, letters, and/or any other appropriate characters or signature. The data bits received from each of the endpoint transceivers 112 are stored in the table in the record corresponding to the sub-sub-channel 406 over which the data bit was received.

After 63 data bits are accumulated for a particular sub-sub-channel 406 and stored in the table, the CmdEpdWr task 904 assembles the 63 data bits into a data packet that includes the serial number of the endpoint transceiver 112 that transmitted the data bits and stores the data packet in the ENDPT.DAT data file 920. After the data packet is formed and stored in the ENDPT.DAT data file 920, the CmdEpdWr task 904 clears the data bits from the table in the CHANBITS.DAT data file 918. In one possible embodiment, the ENDPT.DAT 920 stores 30 data packets for each sub-sub-channel 406. In the exemplary embodiment, each data packet corresponds to about 24 hours worth of data collection, and thus, the ENDPT-.DAT 920 data file stores 30 days worth of data for each sub-sub channel 406.

The CmdFind task 906 and the CmdEpMon task 902 cooperate to find and monitor endpoint transceivers 112 that are connected to one of the distribution line conductors 302, 304, or 306. The CmdFind task 906 makes the initial communication with each endpoint transceiver 112 to assign it a base frequency for data transmission to the substation controller 108. The base frequency is within the bandwidth of an open or unused sub-sun channel 406.

When a new endpoint transceiver 112 is installed, the control server 934 is programmed with the serial number for the new endpoint transceiver 112. The command server 934 then sends the serial number and a find command to find the endpoint transceiver 112 to the CmdExe task 900 via the data link 936 and the Com Serv task 938. The CmdExe task 900 passes the serial number and the find command to the Cmd-Find task 906, which identifies an open sub-sub-channel 406 and maps the serial number to a base frequency within the open sub-sub-channel 406. The CmdFind task 906 relays the serial number, assigned or mapped base frequency, and find command to the Payload task 908, which assembles this data into a FIND ENDPOINT and passes the FIND ENDPOINT data packet to the substation controller 108 as described in more detail herein.

The substation controller 108 then transmits the FIND ENDPOINT data packet downstream on the distribution line conductors 302, 304, and 306 and it is processed by the all of the endpoint transceivers 112. The transceivers process the FIND ENDPOINT data packet. If the endpoint transceiver 112 has the serial number in the FIND ENDPOINT data packet, it transmits an acknowledge signal to the substation controller 108 indicating that it has received its assigned sub-sub-channel 406 and begins transmitting data to the substation controller 108. If the endpoint transceiver 112 does not have the serial number in the FIND ENDPOINT data packet, it discards the FIND ENDPOINT data packet and takes no further action with respect to the data packet.

The CmdEpMon task 902 monitors the status of each sub-sub-channel 406. It receives the signal strength word output by the scaling function 666, the LOS bit output by the LOS detection logic 692, and the noise word output by bit latch 694. Depending on the output of the LOS detection logic 692 and the bit latch 694, the CmdEpMon task 902 changes the status of the sub-sub-channel 406 that is being monitored as described below in conjunction with the CHAT.DAT 916 data file.

The CmdFind task 906 and the CmdEpMon task 902 interface with two data files, FIND.DAT 914 and CHAT.DAT 916.

The FIND.DAT data file 914 stores information related to the process of finding an endpoint transceiver 112. For example, when ever the CmdFind task 906 attempts to find and endpoint transceiver 112, it stores in the FIND.DAT data file 914 an I.D. of the find command, or any other command that is being sent in the FIND ENDPOINT data packet, the serial number of the endpoint transceiver 112 it attempting to find, and the frequency it assigned to the endpoint transceiver 112. The CmdFind task 906 also stores in FIND.DAT 914 a time stamp indicating when transmission of the FIND END-POINT data packet was initiated and a time stamp indicating when the substation controller 108 received a reply or acknowledgement from the endpoint transceiver 112 that it was attempting to find.

The CHAT.DAT data file stores a database that has a record for each sub-sub-channel 406. Each record includes a field identifying the base frequency for the sub-sub-channels 406, the serial number of the endpoint transceiver 112 assigned to that sub-sub-channels 406 (i.e., base frequency with in the sub-sub-channel 406), and the status of the sub-sub-channel 406 (i.e., base frequency with in the sub-sub-channel 406). In the exemplary embodiment, the CHAT.DAT file has 9000 records, each corresponding to one of the 9000 sub-sub-channels 406. In one possible embodiment, the status assigned to a sub-sub-channel 406 selected from the following: Unused, Temporary, Found, Permanent, Blocked, Lost, Restored, and Waiting.

The Unused status is assigned to a sub-sub-channel 406 if it is not assigned to an endpoint transceiver 112. When the CmdFind task 906 receives a find command from the control server 934, it identifies a sub-sub-channel 406 having an Unused status and assigns the base frequency within the identified unused sub-sub-channel 406 to the new endpoint transceiver 112. The CmdFind task 906 then inputs the serial number, find command, and assigned base frequency to the Payload task 908 for processing and down stream transmission.

Upon receiving an acknowledgement from the endpoint transceiver 112, the CmdFind task 906 changes the status of the sub-sub-channel 406 from Unused to Temporary. The CmdExe task 900 then reports the found status of the new endpoint transceiver 112 to the control server 934. Upon reporting the Found status of the endpoint transceiver 112, the CmdFind task 906 changes the status of the assigned sub-sub-channel 406 from Found to Permanent.

The status of a sub-sub-channel 406 is changed to Blocked to prevent an endpoint transceiver 112 from being assigned that sub-sub-channel 406. A sub-sub-channel 406 can have a Blocked status for a variety of reasons. An example includes detection of a noisy sub-sub-channel 406. If the single board computer 540 runs diagnostics and determines that a sub-sub-channel 406 is too noisy or if the Control Server 934 sends an instruction to the substation computer to block out the noisy sub-sub-station 406. In the exemplary embodiment, the single board computer 540 compares the value of the noise word received from the bit latch 694 on the second DSP 538 to a predetermined value, and determines that the channel is too noisy if the value of the noise word is greater than the predetermined value. The noise word corresponds to the level of noise on the sub-sub-channel 406.

If a Blocked status is assigned to a sub-sub-channel 406 that is currently being used by an endpoint transceiver 112, the CmdFind task 906 will select a new sub-sub-channel 406 that has an Unused status and instruct the Payload task 908 to generate and initiate transmission of a FIND ENDPOINT data packet. The serial number for the endpoint transceiver 112 is then stored in the record for the newly assigned sub-sub-channel 406 and the status sequences through the Found and Permanent states as described above.

The status of a particular sub-sub-channel 406 is changed to Lost if the CmdEpMon task 902 determines that there is a loss of power at the frequencies in that sub-sub-channel 406. In the exemplary embodiment, the Work Task 912 receives the signal strength bit from the LOS detection logic 692 and provides the signal strength bit to the CmdEpMon task 902. If the signal strength bit indicates that the endpoint transceiver 112 assigned to that sub-sub-channel 406 is lost, the CmdEp- Mon task 902 changes the status of the sub-sub-channel 406 to Lost and the CmdExe task 900 reports the Lost status for the sub-sub-channel 406 to the control server 934. The Control Server 934 then typically instructs the CmdFind task 906 to find the lost endpoint transceiver 112 assigned to the sub-sub-channel 406. In an alternative embodiment, the CmdFind task 906 automatically attempts to find a lost endpoint transceiver 112.

When a lost endpoint transceiver 112 is found again, the status of the assigned sub-sub-channel 406 is changed from Lost to Restored. The status remains Restored while the Restored status is reported to the Control Server 934 by the CmdExe task 900. The status of the sub-sub-channel 406 is changed from Restored to Permanent upon reporting of the Restored status to the control server 934.

The status of a sub-sub-channel 406 is changed to Wait when the CmdFind task 906 is instructed to find an endpoint transceiver 112 and the current state of the sub-sub-channel 406 is currently Temporary, Found, Permanent, or Restored. When the status of the sub-sub-channel 406 is Wait, the CmdFind task 906 enters a wait state for a predetermined period of time and then instructs the Payload task 908 to generate and transmit a find packet after the predetermined period of time lapses. Because the signal received from the endpoint transceivers 112 are at low frequency, they take a while to decay. Given the frequencies used in the exemplary embodiment, the signal transmitted by the endpoint transceiver 112 can take up to 20 minutes to decay, and the predetermined period of time in which the CmdFind task 906 sits in the wait state is about 20 minutes or longer.

When an endpoint transceiver 112 is found after the wait state of the CmdFind task 906 lapses, the status of the sub-sub-channel 406 is changed to Found while the Found status is being reported to the Control Server 934 and then the status is changed to Permanent after reporting is complete.

The Scheduler task 930 schedules all actions or events that are executed by the single board computer 540 at a predetermined time or in periodic intervals. The Scheduler task 930 schedules and initiates execution of a variety of commands including commands executed internal to the substation processing unit 332. For example, the Scheduler task 930 instructs the CmdEpdWr 904 to retrieve a data bit from the bit latch 660 about once every 20 minutes.

The Scheduler task 930 also schedules the transmission of data packets to the endpoint transceivers 112. For example, the Scheduler task 930 instructs the Payload task 908 to send a TIME data packet to the endpoint transceivers 112 about once every five minutes. The payload for the TIME data packet includes the current date and time as determined by the Net Time task 932, which periodically retrieves the current date and time from the time server and then tracks the current time between download from the time server. If no other data is scheduled for transmission to the endpoint transceivers 112 on the scheduled one-minute intervals, the Scheduler Task 930 instructs the Payload Task to send a TIME data packet by default.

An advantage of frequently sending Time data packets to the endpoint transceivers 112 is that it facilitates synchronous operation, including data collection, of all the endpoint transceivers that are downstream from the substation controller 108. It also facilitates synchronous communication between the substation controller 108 and the endpoint transceivers 112.

In another example and as explained in more detail with respect to the CmdFind task 906, when a new endpoint transceiver 112 is to be installed or a lost endpoint transceiver 112 is being restored, the Scheduler task 930 repeatedly instructs the Payload task 908 to send a FIND ENDPOINT data packet until the new endpoint transceiver 112 acknowledges assignment of a sub-sub-channel 406. The endpoint transceiver 112 acknowledges assignment of a sub-sub-channel 406 by transmitting a data packet that contains an acknowledgment to the substation controller 108 and generating an acknowledgement signal for observation at the endpoint transceiver 112 itself. This repeated transmission of a FIND ENDPOINT data packet is momentarily interrupted when the interval lapses for another scheduled transmission of a data packet, such as a TIME data packet.

In one possible embodiment, the Scheduler task 930 instructs the Payload task to send a data packet to the endpoint transceivers 112 once every minute. An advantage of sending data packets in such short intervals facilitates rapid deployment of newly installed endpoint transceivers 112. As a result, an installer can receive quick confirmation that the endpoint transceiver 112 was successfully installed without waiting for more than a couple of minutes.

The CmdLog task 910 records each command executed by the single board computer and stores the command in the SPU.LOG text file 928. The CmdLog task 910 also executes or initiates execution of various diagnostics of the single board computer 540 and the first and second DSPs 536 and 538, and records the results of the diagnostics in the SPU-.LOG text file 928.

The architecture of the code executed by the single board computer 540 has many advantages. For example, it provides a scalable system because endpoint transceivers 112 can be quickly added to the system by simply installing the endpoint transceiver 112 and entering the serial number of the endpoint transceiver 112 into the control server 934. It also provides flexibility for reassigning endpoint transceivers 112 from the SPU 332 located at one distribution substation 102 to another SPU 332 located at a different distribution substation 102. For example, if service for an endpoint 104 is switched from one distribution substation 102 to a different distribution substation 102, the control server 934 instructs the single board computer 540 located at the different distribution substation 102 to execute a find command for the endpoint transceiver(s) 112 located at the endpoint 104.

Another example occurs when a distribution substation 102 goes offline and service for all of the endpoints 104 downstream from the offline distribution substation 102 are switched to different distribution substations 102. In this example, the control server 934 sends find commands for each of the endpoint transceivers 112 that were originally downstream from the offline distribution substation 102 to the various distribution substations 102 that are still online. The single board computer 540 at the online distribution substations 102 executes the find commands. The single board computer 540 at each of the online distribution substations 102 then registers the downstream endpoint transceivers 112 for which it executed the find command and from which it received an acknowledgment.

Additionally, the single board computer 540 and the control server 934 cooperate to identify and locate faults in the distribution plant. In one possible embodiment, for example, when the status of a sub-sub-channel is Lost and reported to the control server 934, the control server generates an error report so that a service technician can repair or replace the endpoint transceiver 112 assigned to the Lost sub-sub-channel 406. An advantage of automatically reporting the Lost status of sub-sub-channels 406 is that the utility can identify failures as quickly as they are reported. Another advantage is that the energy utility can be made aware of the Lost status (whether it due to a failed endpoint transceiver 112 or a loss of power) before a failure is even reported by a customer and can more quickly take action to repair the failure than if they had to rely on reports from customers.

Several sub-sub-channels being reported as Lost indicates that there is a failure in the distribution system itself. In another possible embodiment, if more than one sub-sub-channel 406 has a Lost status, the control server 934 identifies the common points in the distribution system that are upstream from the endpoint transceivers 112 assigned to the Lost sub-sub-channels. Identifying the common points of the distribution system in the manner helps to identify the potential points of the distribution system that failed resulting in a loss of power at the endpoints. Again, because the single board computer 540 reports the Lost status of the sub-sub-channels 406, the control server 934 can quickly and automatically identify a power failure and isolate possible points in the distribution system where the error could have occurred. As a result, technicians and/or engineers can be dispatched to repair the failure.

In yet another possible embodiment, when some sub-sub-channels 406 have a lost status and other sub-sub-channels 406 do not have a lost status, the control server 934 identifies those points in the distribution system that are upstream from the endpoint transceivers 112 assigned to the Lost sub-sub-channels 406 and not upstream from the endpoint transceivers 112 assigned to the sub-sub-channels 406 that are not Lost. Identifying those points between the endpoint transceivers 112 assigned to the Lost sub-sub-channels 406 and the endpoint transceivers 112 assigned to the sub-sub-channels 406 that are not Lost helps the energy utility more accurately isolate areas of the distribution system where the failure could be located.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A system for bi-directional communication within a power distribution system, the system configured to find an endpoint, the endpoint having an endpoint transceiver in electrical communication with a power distribution line, the power distribution line being within the power distribution system, the endpoint being identified by a unique identifier (I.D.), the system comprising:
 a substation transceiver electrically coupled to a power distribution line within the power distribution system;
 a substation circuit in electrical communication with the substation transceiver, the substation circuit programmed to:
  map the unique I.D. for the endpoint to a base frequency within a bandwidth and to control the substation receiver to transmit a find endpoint data packet onto the power distribution network, the find endpoint data packet including the unique I.D. and the base frequency; and
  assign a status to the base frequency upon receiving a signal from the endpoint the status indicating that the substation transceiver is receiving signals in the frequency bandwidth; and
 a second substation transceiver and a second substation circuit, the second substation transceiver being in electrical communication with the second substation circuit, the second substation transceiver and the second substation circuit being located at a second power distribution substation; and
 a control server in data communication with the substation circuit at the first power distribution substation and the substation circuit at the second power distribution substation;
 wherein, upon a loss of communication between the endpoint and the substation transceiver at the first power distribution substation, the control server instructs the substation circuit at the second substation to map the unique I.D. identifying the endpoint to a base frequency within a bandwidth and to control the substation transceiver at the second power distribution substation to transmit a find endpoint data packet over the power distribution system, the data packet including the unique I.D., for the endpoint and the base frequency, and to assign a status to the base frequency upon receiving a signal from the endpoint, the status indicating that the substation transceiver located at the second power distribution substation is receiving signals in the bandwidth corresponding to the base frequency.

2. The system of claim 1 wherein the substation circuit is further programmed to:
 determine whether the substation transceiver stopped receiving a signal within the bandwidth corresponding to the base frequency assigned to the endpoint transceiver; and
 control the substation transceiver to retransmit the find endpoint data packet containing the unique I.D. of the endpoint and the base frequency assigned to the endpoint transceiver.

3. The system of claim 1 wherein the substation circuit is further programmed to control the substation transceiver to repeatedly transmit the find endpoint data packet in a predetermined interval until the substation transceiver receives a signal from the endpoint identified by the unique I.D.

4. The system of claim 3 wherein the predetermined interval is about minute.

5. The system of claim 3 wherein the substation circuit is further programmed to control the substation transceiver to repeatedly transmit the find endpoint data packet in a predetermined interval, the repeated transmission of the data packet being interrupted only by a prescheduled transmission of an alternative data packet.

* * * * *